(12) United States Patent
Chen et al.

(10) Patent No.: US 11,956,786 B2
(45) Date of Patent: Apr. 9, 2024

(54) CONTENTION-BASED PHYSICAL UPLINK SHARED CHANNEL

(71) Applicant: QUALCOMM Incorporated, San Diego, CA (US)

(72) Inventors: Wanshi Chen, San Diego, CA (US); Ozcan Ozturk, San Diego, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/529,048

(22) Filed: Nov. 17, 2021

(65) Prior Publication Data
US 2022/0150885 A1 May 12, 2022

Related U.S. Application Data

(63) Continuation of application No. 15/359,340, filed on Nov. 22, 2016, now Pat. No. 11,202,282.

(60) Provisional application No. 62/268,325, filed on Dec. 16, 2015.

(51) Int. Cl.
H04W 72/21 (2023.01)
H04L 1/1829 (2023.01)
(Continued)

(52) U.S. Cl.
CPC ........... *H04W 72/21* (2023.01); *H04L 1/1861* (2013.01); *H04L 5/0048* (2013.01);
(Continued)

(58) Field of Classification Search
CPC ............. H04W 72/0413; H04W 76/15; H04W 72/042; H04W 72/1289; H04L 5/0053;
(Continued)

(56) References Cited

U.S. PATENT DOCUMENTS 9,210,695 B2 12/2015 Kim et al.
2010/0081443 A1 4/2010 Meyer et al.
(Continued)

FOREIGN PATENT DOCUMENTS

CN 102149208 A 8/2011
CN 102349273 A 2/2012
(Continued)

OTHER PUBLICATIONS

Alcatel-Lucent: "UCI transmission for dual connectivity and PUCCH resource allocation", 3GPP TSG RAN WG1 Meeting #76, R1-140164, Prague, Czech Republic, Feb. 10-14, 2014, 3 pages.
(Continued)

*Primary Examiner* — Ayaz R Sheikh
*Assistant Examiner* — Tarell A Hampton
(74) *Attorney, Agent, or Firm* — Holland & Hart LLP

(57) ABSTRACT

Methods, systems, and devices for wireless communication are described. A user equipment (UE) may identify uplink (UL) control information (UCI) to transmit during a subframe. The UE may then select a UL channel on which to transmit the UCI based on whether a shared data and control UL channel employs contention-based scheduling. For example, multiple UEs could contend for access to the same semi-persistently scheduled (SPS) physical UL shared channel (PUSCH). Each UE may utilize a different demodulation reference (DMRS) signal cyclic shift to identify their transmissions. In some cases, some UCI, such as channel state information (CSI), may be transmitted on a contention-based PUSCH, while other UCI, such as acknowledgement information, may be transmitted on a physical uplink control channel (PUCCH). In some cases, the channel selection may be based on a configuration received from a base station.

16 Claims, 23 Drawing Sheets

(51) Int. Cl.
*H04L 5/00* (2006.01)
*H04L 27/26* (2006.01)
*H04W 72/23* (2023.01)
*H04W 76/15* (2018.01)

(52) U.S. Cl.
CPC ........ *H04L 5/0053* (2013.01); *H04L 27/2607* (2013.01); *H04W 72/23* (2023.01); *H04W 76/15* (2018.02); *H04L 5/001* (2013.01)

(58) Field of Classification Search
CPC . H04L 27/2607; H04L 1/1861; H04L 5/0048; H04L 5/001
See application file for complete search history.

(56) References Cited

U.S. PATENT DOCUMENTS

| | | |
|---|---|---|
| 2010/0220652 A1* | 9/2010 | Ishii ................ H04L 5/0085 370/328 |
| 2010/0238984 A1 | 9/2010 | Sayana et al. |
| 2010/0271970 A1 | 10/2010 | Pan et al. |
| 2011/0039568 A1 | 2/2011 | Zhang et al. |
| 2011/0093756 A1 | 4/2011 | Yang et al. |
| 2011/0128928 A1 | 6/2011 | Lin et al. |
| 2011/0171985 A1 | 7/2011 | Papasakellariou et al. |
| 2011/0194432 A1 | 8/2011 | Kato et al. |
| 2011/0223924 A1 | 9/2011 | Lohr et al. |
| 2011/0239072 A1 | 9/2011 | Cai |
| 2011/0243066 A1 | 10/2011 | Nayeb Nazar et al. |
| 2011/0292895 A1 | 12/2011 | Wager et al. |
| 2012/0044878 A1 | 2/2012 | Ratasuk et al. |
| 2012/0176996 A1 | 7/2012 | Kim et al. |
| 2012/0281576 A1 | 11/2012 | Yamada et al. |
| 2012/0300635 A1 | 11/2012 | Jersenius et al. |
| 2012/0307767 A1 | 12/2012 | Yamada et al. |
| 2013/0028219 A1 | 1/2013 | Lee et al. |
| 2013/0102320 A1 | 4/2013 | Suzuki et al. |
| 2013/0114554 A1 | 5/2013 | Yang et al. |
| 2013/0163537 A1 | 6/2013 | Anderson et al. |
| 2013/0201964 A1 | 8/2013 | Kim et al. |
| 2014/0241319 A1 | 8/2014 | Lee et al. |
| 2015/0043521 A1 | 2/2015 | Park et al. |
| 2015/0049699 A1* | 2/2015 | Takeda ................ H04L 5/0055 370/329 |
| 2015/0156760 A1* | 6/2015 | Yu ................ H04W 72/042 370/329 |
| 2015/0289234 A1 | 10/2015 | Zhao et al. |
| 2016/0212734 A1 | 7/2016 | He et al. |
| 2016/0330693 A1 | 11/2016 | Hwang et al. |
| 2017/0013565 A1 | 1/2017 | Pelletier et al. |
| 2017/0041981 A1 | 2/2017 | Kela et al. |
| 2017/0118658 A1 | 4/2017 | Hwang et al. |
| 2017/0181155 A1 | 6/2017 | Chen et al. |
| 2017/0208581 A1 | 7/2017 | Yang et al. |
| 2017/0367058 A1 | 12/2017 | Pelletier et al. |

FOREIGN PATENT DOCUMENTS

| | | |
|---|---|---|
| CN | 103004116 A | 3/2013 |
| CN | 103069914 A | 4/2013 |
| CN | 103229447 A | 7/2013 |
| CN | 104378833 A | 2/2015 |
| CN | 108370301 B | 6/2021 |
| KR | 20120089454 A | 8/2012 |

OTHER PUBLICATIONS

Alcatel-Lucent: "UL Power Control and Power Scaling/Splitting for Dual Connectivity", 3GPP TSG RAN WG1 Meeting #76bis, R1-141248, Shenzhen, China, Mar. 31-Apr. 4, 2014, pp. 1-6.
Asustek., "The Impact of Latency Reduction on UL SPS", 3GPP Draft, R2-154534, The Impact of Latency Reduction on UL SPS V1, 3rd Generation Partnership Project (3GPP), Mobile Competence Centre ; 650, Route Des Lucioles, F-06921, Sophia-Antipolis Cedex, Fra, vol. RAN WG2, No. Malmo, Sweden, Sep. 5, 2015-Sep. 9, 2015, Oct. 4, 2015, XP051005070, Retrieved from the Internet: URL:http:llwww.3gpp.orgjftp/Meetings_3GPPSYNC/RAN2/Docs/.
CATT., "Feedback for SPS PDCCH Command", 3GPP Draft, 3GPP TSG-RAN WG2#92, R2-156256, 3rd Generation Partnership Project (3GPP), Mobile Competence Centre, 650, Route Des Lucioles, F-06921, Sophia-Antipolis Cedex, France, vol. RAN WG2, No. Anaheim, USA, Nov. 16, 2015-Nov. 20, 2015, Nov. 16, 2015, XP051005752, 3 Pages, Section 2, Retrieved from the Internet: URL:http://www.3gpp.org/ftp/Meetings3GPPSYNC/RAN2/DOCS/.
CATT: "UCI Transmission on PUSCH" 3GPP Draft, 3GPP TSG RAN WG1 Meeting #83, R1-156572, Anaheim, USA, Nov. 15-22, 2015, pp. 1-3, Section 2.
Ericsson: "Way Forward on UCI transmission in Dual Connectivity transmission", R1-140954, 3 pages.
Huawei et al., "Further Analysis on Uplink Transmission Skipping", 3GPP Draft, R2-156296, Further Analysis on Uplink Transmission Skipping, 3rd Generation Partnership Project (3GPP), Mobile Competence Centre, 650, Route Des L. Ucioles, F-06921, Sophia-Anti Polis Cedex, vol. RAN WG2, No. Anaheim, USA, Nov. 16, 2015-Nov. 20, 2015, Nov. 16, 2015, 2 Pages, XP051005779. Retrieved from the Internet: URL: http.//www.3gpp.org/ftp/Meetings_3GPP_SYNC/RAN2/Docs/.
Huawei., et al., "Uplink Latency Reduction for Synchronized UEs", 3GPP Draft, R2-153374, Uplink Latency Reduction for Synchronized UEs, 3rd Generation Partnership Project (3GPP), Mobile Competence Centre, 650, Route Des Lucioles, F-06921, Sophia-Antipolis Cedex, vol. RAN WG2, No. Beijing, China, Aug. 24, 2015-Aug. 28, 2015, Aug. 23, 2015, 5 Pages, XP051004102, Retrieved from the internet:URL:https://www.3gpp.org/ftp/Meetings_3GPP_SYNC/RAN2/Docs/.
Huawei: "Further details on SR sharing", 3GPP TSG RAN WG2 Meeting #69, R2-101052, San Francisco, USA, Feb. 22-26, 2010, pp. 1-11.
Institute for Information Industry (III): "Scheduling request based on prescheduling transmission", 3GPP TSG-RAN WG2 Meeting #92, R2-156244, Anaheim, USA, Nov. 16-20, 2015, pp. 1-4.
International Preliminary Report on Patentability—PCT/US2016/063492, The International Bureau of WIPO—Geneva, Switzerland, dated Jun. 28, 2018.
International Search Report and Written Opinion—PCT/US2016/063492—ISA/EPO—dated Feb. 17, 2017.
Lenovo., "Supporting MU-MIMO in Enhanced Uplink SPS Transmission", 3GPP Draft, R2-154533, 3rd Generation Partnership Project (3GPP), Mobile Competence Centre, 650, Route Des Lucioles, F-06921, Sophia-Antipolis Cedex, France, vol. RAN WG2, No. Malmo, Sweden, Oct. 5, 2015-Oct. 9, 2015, Oct. 4, 2015, XP051005069, Retrieved from the Internet: URL:http://www.3gpp.orgjftp/Meetings3GPPSYNC/RAN2/Docs/.
LG Electronics: "Discussion on Remaining Issues on PUSCH Design for eMTC", 3GPP Draft, R1-156842, PUSCH, 3rd Generation Partnership Project (3GPP), Mobile Competence Centre, 650, Route Des Lucioles, F-06921, Sophia-Antipolis Cedex, France, vol. RAN WG1, No. Anaheim, USA, Nov. 15, 2015-Nov. 22, 2015, Nov. 15, 2015, XP051003198, Retrieved from the Internet: URL:http://www.3gpp.org/ftp/Meetings3GPPSYNC/RAN1/Docs/.
Lu Y., et al., "Uplink Control for Low Latency HARQ in TDD Carrier Aggregation", 2012 IEEE 75th Vehicular Technology Conference (VTC Spring 2012), Yokohama, Japan, IEEE Piscataway, NJ, May 6-9, 2012 (May 6, 2012), 5 pages, XP032202607, DOI: 10.1109/VETECS.2012.6240190, ISBN: 978-1-4673-0989-9, abstract Section I, p. 1, Section II.

(56) References Cited

OTHER PUBLICATIONS

3GPP TR 36.881, "3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, 86 Pages.

Qualcomm Incorporated: "Procedures for Dual Connectivity", 3GPP TSG-RAN2#84, R2-134002, 3rd Generation Partnership Project, Mobile Competence Centre; 650, Route Des Lucioles; F-06921 Sophia-Antipolis Cedex, France, vol. RAN WG2, No. San Francisco, USA, Nov. 11, 2013-Nov. 15, 2013, Nov. 13, 2013, XP050736810, Section 2.1, Table 1 Sections 2.3 and 2.4.

Qualcomm Incorporated: "SPS Support", 3GPP TSG RAN WG1 #83, R1-157029, Nov. 15-22, 2015, Anaheim, USA, 3 Pages.

* cited by examiner

CONTENTION-BASED PHYSICAL UPLINK SHARED CHANNEL

CROSS REFERENCES

The present Application for Patent is a Continuation of U.S. patent application Ser. No. 15/359,340 by CHEN et al., entitled "CONTENTION-BASED PHYSICAL UPLINK SHARED CHANNEL" and filed Nov. 22, 2016, which claims priority to U.S. Provisional Patent Application No. 62/268,325 by CHEN et al., entitled "CONTENTION-BASED PHYSICAL UPLINK SHARED CHANNEL" and filed Dec. 16, 2015, each of which is assigned to the assignee hereof and incorporated herein by reference.

BACKGROUND

The following relates generally to wireless communication and more specifically to a contention-based physical uplink shared channel (PUSCH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology. A wireless multiple-access communications system, including a system operating according to the LTE standard, may include a number of base stations, each simultaneously supporting communication for multiple communication devices, which may otherwise be known as user equipment (UE).

Uplink control information (UCI) may be used by a UE to transmit data such as acknowledgement data or channel state information (CSI) to a base station. UCI may be transmitted using resources on a physical uplink control channel (PUCCH) or a physical uplink shared channel (PUSCH). In some cases, UCI may be transmitted on resources assigned to multiple UEs, but such resources may be unsuitable or undesirable for transmitting UCI in some circumstances. Furthermore, uplink resources may be scheduled according to a semi-persistent grant, but this may result in unused resources when a UE does not have UL data to transmit or if collisions between transmissions from different UEs are not resolved.

SUMMARY

A user equipment (UE) may identify uplink (UL) control information (UCI) to transmit during a subframe. The UE may then select a UL channel on which to transmit the UCI based on whether a shared (e.g., data) UL channel uses contention-based scheduling. For example, multiple UEs could contend for access to the same semi-persistently scheduled (SPS) physical UL shared channel (PUSCH). Each UE may utilize a different demodulation reference (DMRS) signal cyclic shift to identify their transmissions. In some cases, some UCI, such as channel state information (CSI), may be transmitted on a contention-based PUSCH, while other UCI, such as acknowledgement information, may be transmitted on a physical uplink control channel (PUCCH). In some cases, the channel selection may be based on a configuration received from a base station.

A method of wireless communication is described. The method may include identifying uplink (UL) control information (UCI) to transmit during a subframe, identifying a scheduling type for a UL data channel during the subframe, and determining whether to transmit the uplink control information (UCI) on the UL data channel based at least in part on the scheduling type.

An apparatus for wireless communication is described. The apparatus may include means for identifying UL control information (UCI) to transmit during a subframe, means for identifying a scheduling type for a UL data channel during the subframe, and means for determining whether to transmit the UCI on the UL data channel based at least in part on the scheduling type.

A further apparatus is described. The apparatus may include a processor, memory in electronic communication with the processor, and instructions stored in the memory. The instructions may be operable, when execute by the processor, to cause the apparatus to identify UL control information (UCI) to transmit during a subframe, identify a scheduling type for a UL data channel during the subframe, and determine whether to transmit the UCI on the UL data channel based at least in part on the scheduling type.

A non-transitory computer readable medium for wireless communication is described. The non-transitory computer-readable medium may include instructions to cause a processor to identify UL control information (UCI) to transmit during a subframe, identify a scheduling type for a UL data channel during the subframe, where the scheduling type comprises a contention-based scheduling type or a non-contention-based scheduling type and determine whether to transmit the UCI on the UL data channel based on the scheduling type.

Some examples of the method, apparatus, or non-transitory computer-readable medium described above may further include processes, features, means, or instructions for receiving a grant for the UL channel, where the scheduling type is identified based on the grant.

Some examples of the method, apparatus, or non-transitory computer-readable medium described above may further include processes, features, means, or instructions for receiving at least one of a configuration or an activation message for a semi-persistent scheduling (SPS) of the UL channel, where the scheduling type is identified based on the SPS. Some examples of the method, apparatus, or non-transitory computer-readable medium described above may further include where the scheduling type comprises of at least a contention-based scheduling type and a non-contention based scheduling type.

Some examples of the method, apparatus, or non-transitory computer-readable medium described above may further include processes, features, means, or instructions for determining that physical (PHY) hybrid automatic repeat request (HARQ) indicator channel (PHICH) monitoring is disabled for the SPS. Some examples of the method, apparatus, or non-transitory computer-readable medium described above may further include processes, features, means, or instructions for refraining from monitoring a physical HARQ indicator channel (PHICH) based on the determination that PHICH monitoring is disabled.

Some examples of the method, apparatus, or non-transitory computer-readable medium described above may further include processes, features, means, or instructions for receiving a PHICH monitoring indication in a radio resource control (RRC) configuration message, where the determination that PHICH monitoring is disabled is based on the PHICH monitoring indication.

In some examples of the method, apparatus, or non-transitory computer-readable medium described above, the determination that PHICH monitoring is disabled is based on whether a demodulation reference signal (DMRS) cyclic shift is configured.

Some examples of the method, apparatus, or non-transitory computer-readable medium described above may further include processes, features, means, or instructions for identifying a set of PHICH resources for the SPS based on a DMRS cyclic shift. Some examples of the method, apparatus, or non-transitory computer-readable medium described above may further include processes, features, means, or instructions for monitoring the set of PHICH resources.

Some examples of the method, apparatus, or non-transitory computer-readable medium described above may further include processes, features, means, or instructions for identifying a periodicity of the SPS. Some examples of the method, apparatus, or non-transitory computer-readable medium described above may further include processes, features, means, or instructions for determining whether transmission time interval (TTI) bundling is supported based on the periodicity of the SPS.

In some examples of the method, apparatus, or non-transitory computer-readable medium described above, the SPS of the UL data channel is configured for a primary cell (PCell) of a physical uplink control channel (PUCCH) group.

Some examples of the method, apparatus, or non-transitory computer-readable medium described above may further include processes, features, means, or instructions for identifying a physical uplink shared channel (PUSCH) selection parameter for a dual connectivity configuration. Some examples of the method, apparatus, or non-transitory computer-readable medium described above may further include processes, features, means, or instructions for selecting a cell of the dual connectivity configuration based on the PUSCH selection parameter, where the UL data channel is associated with the selected cell.

Some examples of the method, apparatus, or non-transitory computer-readable medium described above may further include processes, features, means, or instructions for determining whether to transmit the UCI on the UL data channel based on an information type of the UCI. Some examples of the method, apparatus, or non-transitory computer-readable medium described above may further include processes, features, means, or instructions for transmitting the UCI on a different UL data channel based on the information type of the UCI being HARQ feedback. Some examples may include refraining from to transmitting the UCI on the UL data channel based at least in part on the scheduling type.

In some examples of the method, apparatus, or non-transitory computer-readable medium described above, the different UL data channel is at least one of a control channel or a data channel. In some examples of the method, apparatus, or non-transitory computer-readable medium described above, the different UL data channel is located at a same carrier as the UL channel.

In some examples of the method, apparatus, or non-transitory computer-readable medium described above, the different UL data channel is located at a different carrier different than the UL channel. Some examples of the method, apparatus, or non-transitory computer-readable medium described above may further include processes, features, means, or instructions for transmitting the UCI on the UL data channel based on the information type of the UCI being channel state information (CSI).

Some examples of the method, apparatus, or non-transitory computer-readable medium described above may further include processes, features, means, or instructions for receiving a RRC configuration message indicating the scheduling type. Some examples of the method, apparatus, or non-transitory computer-readable medium described above may further include processes, features, means, or instructions for receiving a configuration of a DMRS cyclic shift for the scheduling type.

Some examples of the method, apparatus, or non-transitory computer-readable medium described above may further include processes, features, means, or instructions for identifying one or more downlink (DL) control information (DCI) search parameters based on the scheduling type. Some examples of the method, apparatus, or non-transitory computer-readable medium described above may further include processes, features, means, or instructions for monitoring a UE-specific search space based on the one or more downlink control information (DCI) search parameters.

Some examples of the method, apparatus, or non-transitory computer-readable medium described above may further include processes, features, means, or instructions for performing a contention procedure for the UL data channel based on the scheduling type. Some examples of the method, apparatus, or non-transitory computer-readable medium described above may further include processes, features, means, or instructions for transmitting the UCI on the UL data channel based on the contention procedure and on the determination.

Another method of wireless communication is described. The method may include transmitting a control message to a UE that indicates a UL control information (UCI) handling configuration, identifying a scheduling type for a UL data channel during a subframe, the scheduling type being a contention-based scheduling type or a non-contention-based scheduling type and receiving UCI from the UE, wherein the UCI is transmitted based at least in part on the UCI handling configuration and the scheduling type.

Another apparatus for wireless communication is described. The apparatus may include means for transmitting a control message to a UE that indicates a UL control information (UCI) handling configuration, means for identifying a scheduling type for a UL data channel during a subframe, the scheduling type being a contention-based scheduling type or a non-contention-based scheduling type and means for receiving UCI from the UE, wherein the UCI is transmitted based at least in part on the UCI handling configuration and the scheduling type.

A further apparatus is described. The apparatus may include a processor, memory in electronic communication with the processor, and instructions stored in the memory. The instructions may be operable, when executed by the processor, to cause the apparatus to transmit a control message to a UE that indicates a UL control information (UCI) handling configuration, identify a scheduling type for a UL data channel during a subframe, the scheduling type being a contention-based scheduling type or a non-contention-based scheduling type and receive UCI from the UE, wherein the UCI is transmitted based at least in part on the UCI handling configuration and the scheduling type.

Another non-transitory computer readable medium for wireless communication is described. The non-transitory computer-readable medium may include instructions to cause a processor to transmit a control message to a UE that indicates a UL control information (UCI) handling configuration, identify a scheduling type for a UL data channel during a subframe, where the scheduling type comprises a contention-based scheduling type or a non-contention-based scheduling type and receive UCI from the UE, where the UCI is transmitted based on the UCI handling configuration and the scheduling type.

Some examples of the method, apparatus, or non-transitory computer-readable medium described above may further include processes, features, means, or instructions for transmitting a grant for the UL channel, where the scheduling type is based on the grant. Some examples of the method, apparatus, or non-transitory computer-readable medium described above may further include processes, features, means, or instructions for transmitting at least one of a configuration or an activation message for a semi-persistent scheduling (SPS) of the UL channel, where the scheduling type is based on the SPS.

Some examples of the method, apparatus, or non-transitory computer-readable medium described above may further include processes, features, means, or instructions for transmitting a release message for the SPS. Some examples of the method, apparatus, or non-transitory computer-readable medium described above may further include processes, features, means, or instructions for transmitting a control message indicating that PHY HARQ indicator channel (PHICH) monitoring is disabled for the SPS. In some examples of the method, apparatus, or non-transitory computer-readable medium described above, the SPS of the UL data channel is configured for a PCell of a PUCCH group.

Some examples of the method, apparatus, or non-transitory computer-readable medium described above may further include processes, features, means, or instructions for identifying a PUSCH selection parameter for a dual connectivity configuration. Some examples of the method, apparatus, or non-transitory computer-readable medium described above may further include processes, features, means, or instructions for selecting a cell of the dual connectivity configuration based on the PUSCH selection parameter, where the UL data channel is associated with the selected cell.

In some examples of the method, apparatus, or non-transitory computer-readable medium described above, the UCI is transmitted on the UL data channel based on an information type of the UCI. Some examples of the method, apparatus, or non-transitory computer-readable medium described above may further include processes, features, means, or instructions for receiving the UCI on a different UL data channel based on the information type of the UCI being HARQ feedback.

In some examples of the method, apparatus, or non-transitory computer-readable medium described above, the different UL data channel is at least one of a control channel or a data channel. In some examples of the method, apparatus, or non-transitory computer-readable medium described above, the different UL data channel is located at a same carrier as the UL channel. In some examples of the method, apparatus, or non-transitory computer-readable medium described above, the different UL data channel is located at a different carrier different than the UL channel.

Some examples of the method, apparatus, or non-transitory computer-readable medium described above may further include processes, features, means, or instructions for receiving the UCI on the UL data channel based on the information type of the UCI being CSI.

Some examples of the method, apparatus, or non-transitory computer-readable medium described above may further include processes, features, means, or instructions for transmitting a RRC configuration message indicating the scheduling type. Some examples of the method, apparatus, or non-transitory computer-readable medium described above may further include processes, features, means, or instructions for transmitting a configuration message indicating a DMRS cyclic shift for the scheduling type.

DETAILED DESCRIPTION

Contention-based scheduling may be employed to reduce latency for communication in portions of the radio frequency spectrum used by licensed wireless providers. That is, multiple user equipments (UEs) operating in so-called licensed spectrum may be assigned the same set of UL resources (or overlapping resources), and may perform a contention procedure when they have data to transmit. This may allow for more frequently occurring semi-persistent scheduling (SPS) periods because assigning resources to one UE does not preclude the possibility of assigning the same resources to another UE. Various techniques for control information handling, UE identification, and resource monitoring may be employed to facilitate efficient content-based scheduling.

In a system that supports contention-based scheduling, a UE may transmit uplink control information (UCI) on individually granted resources or on contention-based resources (e.g., on a contention-based SPS physical uplink shared channel (PUSCH)). The determination of whether to use individually granted resources or contention-based SPS PUSCH may be based on an explicit or implicit indication. UCI handling may also depend on UCI type. For example, acknowledgement information may not be transmitted on the SPS PUSCH, while Channel State Information (CSI) may be piggybacked (i.e., transmitted in conjunction with) on the SPS PUSCH.

Different demodulation reference signal (DMRS) cyclic shifts for each UE assigned to the same contention-based UL resources may allow a base station to identify different UEs transmitting on the UL resources. The DMRS cyclic shifts for each UE may be configured dynamically (e.g., in an SPS activation message) or using radio resource control (RRC) signaling. This may be beneficial during instances when collision of packets occurs or is likely to occur.

In a contention-based scheme, two or more UEs may be scheduled with the same physical hybrid automatic repeat request (HARQ) indicator channel (PHICH) resource. That is, since DMRS cyclic shift is not involved in PHICH resource derivation for UL SPS, some UEs assigned with common resources may map to the same PHICH resource. So in some cases one or more of the UEs may skip monitoring the PHICH. In some other cases, threshold rules for SPS periodicity may be used to determine PHICH monitoring.

Aspects of the disclosure introduced above are described below in the context of a wireless communication system. Further examples illustrate processes for UCI handling during a contention-based PUSCH procedure. These and other aspects of the disclosure are further illustrated by and described with reference to apparatus diagrams, system diagrams, and flowcharts that relate to contention-based PUSCH.

Figure 1:
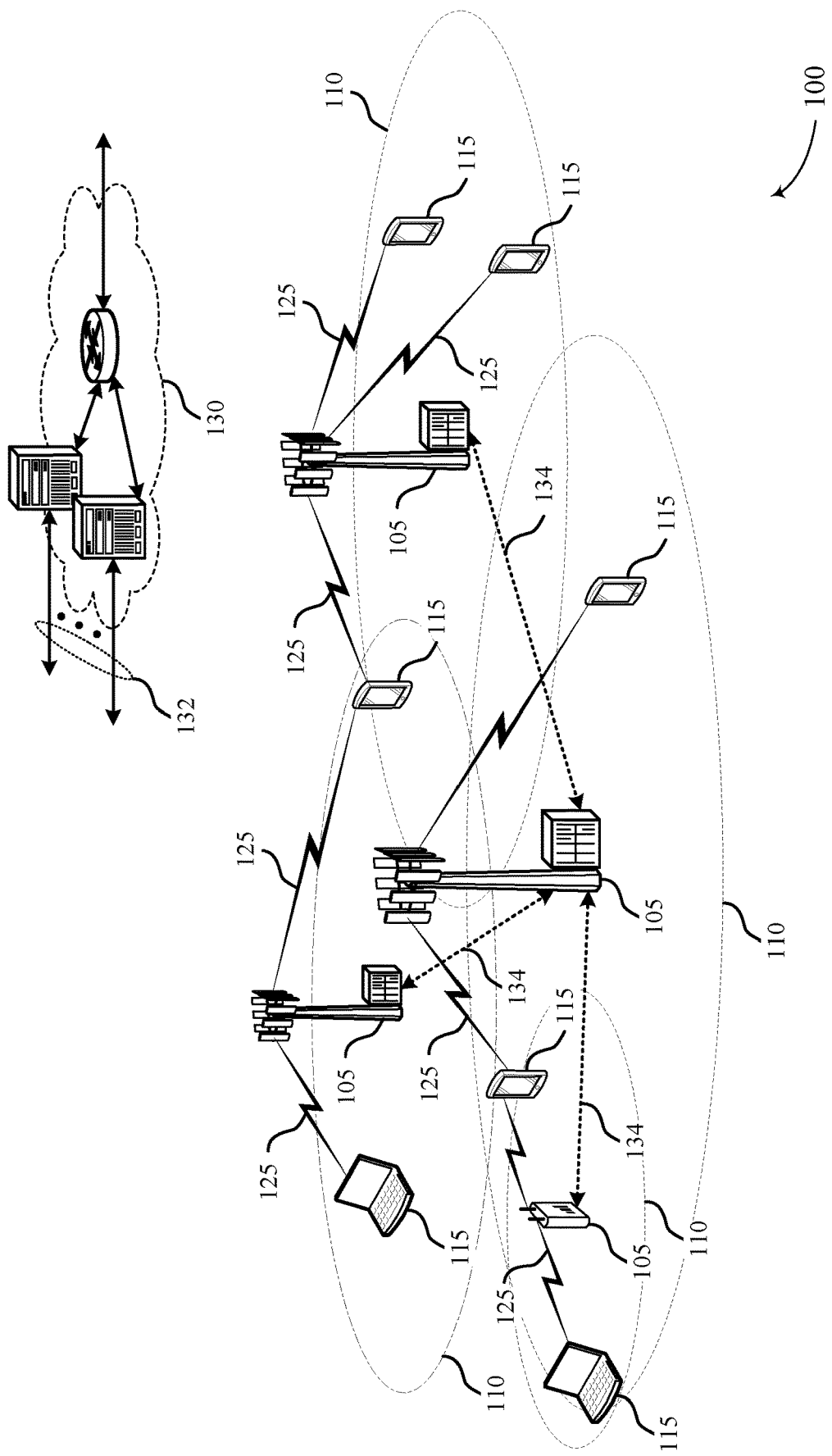
FIG. 1 illustrates an example of a wireless communications system that supports contention-based PUSCH in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communication system 100 may support contention-based PUSCH.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may be a cellular phone, a wireless modem, a handheld device, a personal computer, a tablet, a personal electronic device, a machine type communication (MTC) device, or the like. Some of the UEs 115 support communication using contention-based scheduling.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may support contention-based scheduling.

Data in wireless communications system 100 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data.

DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data.

DL physical channels may include physical broadcast channel (PBCH) for broadcast information, physical control format indicator channel (PCFICH) for control format information, physical downlink control channel (PDCCH) for control and scheduling information, PHICH for hybrid automatic repeat request (HARQ) status messages, physical downlink shared channel (PDSCH) for user data and physical multicast channel (PMCH) for multicast data. UL physical channels may include physical random access channel (PRACH) for access messages, PUCCH for control data, and PUSCH for user data.

HARQ is a method of determining that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response, and retransmission may be referred to as a HARQ process. In some cases, a limited number of HARQ processes may be used for a given communication link 125.

A base station 105 may gather channel condition information from a UE 115 in order to efficiently configure and schedule the channel. This information may be sent from the UE 115 in the form of a channel state report. A channel state report may contain an rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell-specific reference signals (CRS) or CSI-RS. RI and PMI may be excluded if the UE 115 does not support spatial multiplexing (or is not in support spatial mode). The types of information included in the report determine a reporting type.

Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105. Channel state reports, like other UCI, may be transmitted on different UL channels depending on whether a UE 115 has been assigned individually granted resources or contention-based resources.

In some cases, a UE 115 or base station 105 may operate in shared portions of licensed or unlicensed radio frequency spectrum. These devices may perform a clear channel assessment (CCA) prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. A UE 115 may perform a CCA operation before communication on contention-based resources.

In wireless communications system 100, semi-persistent scheduling (SPS) may be employed when a base station 105 defines and designates a transmission pattern uplink (UL) or downlink (DL) transmission. This is in contrast to schemes in which the base station 105 individually schedules each UL or DL transmission for a given UE. SPS may thus reduce scheduling assignment overhead. Radio resource control (RRC) signaling may be used to configure one or more of the following for uplink UL SPS: SPS radio network temporary identity (RNTI), SPS intervals (for example, 10 ms, 20 ms, 32 ms, 40 ms, 64 ms, etc.), an implicit release timer (for example, 2, 3, 4, or 8 transmissions), and an open loop power control for SPS. In some cases, if two uplink subframe sets are configured for the UE, there may be two or more open loop power control parameters for SPS as well. For time division duplex (TDD) configurations, RRC may indicate a number of intervals for UL SPS.

A new data indicator (NDI) may be included in an SPS activation message. The NDI may, for example, be set to 0 for activation of radio resources for SPS. Or if NDI is set to 1, it may signify a SPS retransmission in examples. In some cases, the activation message cyclic redundancy check (CRC) may be masked with the configured SPS C-RNTI.

Various Downlink Control Information (DCI) formats may be used in system 100, as described further below. Various DCI formats may be used activate or release SPS. The manner in which fields a particular DCI message are used may depend on whether contention-based SPS is employed.

Following transmission of UL data, a UE 115 may use PHICH to determine SPS transmissions. In some cases, a UE 115 may be scheduled with PDCCH or EPDCCH to override PHICH. In some cases, dynamic scheduling PDCCH may have priority over PHICH regarding monitoring priority.

UL transmissions may include DMRS, which may be used for channel estimation and coherent demodulation of UL channels, e.g., PUSCH, PUCCH, contention-based UL channels, and the like. As discussed below, different UEs 115 may transmit DMRS with different cyclic shifts, and the cyclic shift aid a base station 105 in identifying a UE 115 associated with a particular transmission when collisions between UL transmissions occur.

For UL HARQ operation, a UE 115 may determine, for a SPS transmission in subframe n, the corresponding PHICH resource in subframe n+k, where the value k may depend on FDD/TDD configurations, interference mitigation configurations, and the like. Additionally, the resource in subframe n+k may be a function of the starting physical resource block (PRB) index. In some cases, this may be different from dynamically scheduled PUSCH, for which the PHICH resource is a function of a starting PRB index and a 3-bit DMRS cyclic shift value in the most recent DCI. For UL SPS, the DMRS cyclic shift value may be zero. As described below, a UE 115 that has been assigned contention-based resources may, in some examples, refrain from monitoring PHICH resources.

Transmission time interval (TTI) bundling may also be employed in system 100. TTI bundling may involve sending a transport block multiple times in consecutive or non-consecutive subframes without waiting for HARQ ACK/NACK messages. UL TTI bundling may be configured to improve UL coverage. In some cases, TTI bundling may be configured along with UL SPS for FDD. In other cases, including certain TDD examples, TTI bundling may not be configured with UL SPS in order to avoid undue complexities.

UL SPS may be configured so that it may be compatible with carrier aggregation (CA) or dual-connectivity (DC). For example, in CA, UL SPS may only be configured on the primary cell (PCell). In DC, UL SPS may be configured on the PCell of a primary cell group and on the primary-secondary cell (PSCell) of the secondary cell group.

In some cases, SPS PUSCH may be used together with DCI format 3/3A for uplink transmit power control with 1 bit or 2 bit power adjustment. For example, group power control via DCI formats 3/3A may be used for UL SPS PUSCH transmissions. In such cases, an initial transmission may not be scheduled on PUSCH.

In some examples, wireless communications system 100 may utilize one or more enhanced component carriers (eCCs). An eCC may be characterized by one or more features including: flexible bandwidth, different TTIs, and modified control channel configuration. In some cases, an eCC may be associated with a CA configuration or a dual connectivity configuration (e.g., when multiple serving cells have a suboptimal backhaul link). An eCC may also be configured for use in unlicensed spectrum, licensed spectrum, or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may use a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

Within system 100, a UE 115 may identify UCI and select a UL channel to transmit the UCI based on whether a shared UL channel uses contention-based scheduling. For example, multiple UEs 115 could contend for access to the same semi-persistently scheduled (SPS) PUSCH. Each UE 115 may utilize a different DMRS signal cyclic shift to identify their transmissions. In some cases, some UCI, such as CSI, may be transmitted on a contention-based PUSCH, while other UCI, such as HARQ information, may be transmitted on a physical uplink control channel (PUCCH). In some cases, the channel selection may be based on a configuration received from a base station 105.

Figure 2:
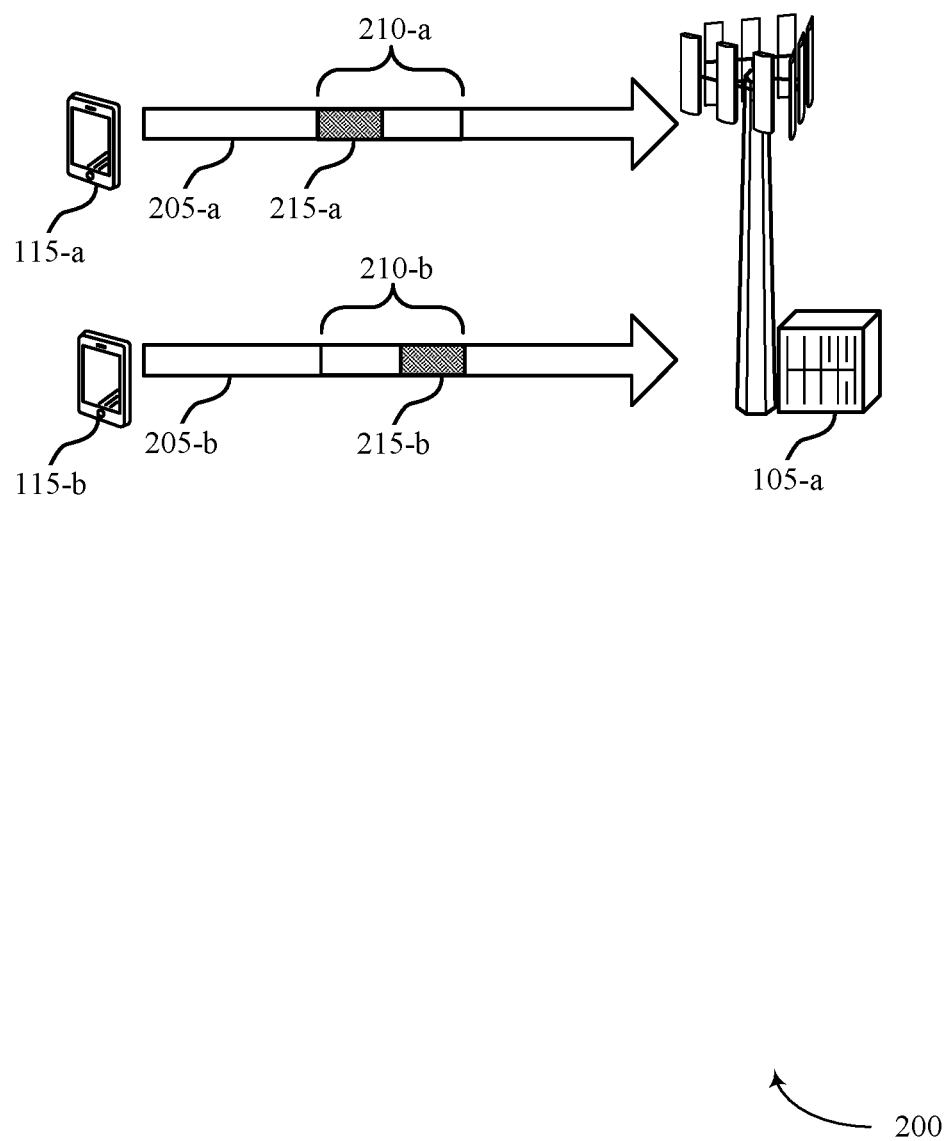
FIG. 2 illustrates an example of a wireless communications system that supports contention-based PUSCH in accordance with aspects of the present disclosure.

FIG. 2 illustrates an example of a wireless communications system 200 for contention-based PUSCH. Wireless communications system 200 may include base station 105-a and UEs 115-a and 115-b, which may be examples of the corresponding devices described with reference to FIG. 1. UEs 115-a and 115-b may communicate on the UL with base station 105 using UL channels 205-a and 205-b, respectively. Wireless communications system 200 may support contention-based PUSCH on UL channels 205-a and 205-b. Accordingly, UEs 115-a and 115-b may selectively transmit UCI on the PUSCH or PUCCH based on type of UCI and whether the PUSCH is contention based.

Contention-based scheduling may be used in licensed or unlicensed spectrum to reduce latency. UEs 115-a and 115-b may be assigned the same set of UL resources (or overlapping resources), such as SPS resources 210-a and 210-b. Thus, UEs 115-a and 115-b may perform a contention procedure when they have data to transmit using these resources. As mentioned, use of SPS may reduce control channel overhead for applications requiring continuous radio resource allocations. For example, contention-based SPS may enable the use of more frequently occurring SPS periods because assigning the resources to, e.g., UE 115-a does not preclude the possibility of assigning the same resources to UE 115-b. In some cases, SPS periods may be as short as 1 ms, or even smaller than 1 ms if, for example, a shortened TTI is supported. In other cases, a reduction of padding for dynamic or SPS-based UL scheduling may also be employed to reduce latency.

As mentioned above, various DCI messages, and the fields of those messages, may be used to activate or release SPS. For example, DCI format 0 may be used to signify UL SPS activation. For SPS on non-contention-based resources, a 3-bit DMRS cyclic shift field of the DCI format 0 message may be set to 000 to indicate SPS activation. Other information fields (e.g., resource allocation) may be set depending on whether contention or non-contention-based resources are used and thus, in some cases, may be similar to dynamic uplink assignments. For example, a field for modulation and coding scheme (MCS) and redundancy version may be set to "0." Table 1 below depicts the 6 bits generally set to "0."

TABLE 1

| SPS Activation Message Fields | |
|---|---|
| | DCI format 0 |
| TPC command for scheduled PUSCH | set to "00" |
| Cyclic Shift DMRS | set to "000" |
| Modulation and coding scheme and redundancy version | MSB set to "0" |

DCI format 0 may also be used for UL SPS release. For SPS on non-contention-based resources, a 3-bit DMRS cyclic shift may be set to 000. Other fields may have all bits of the field set to "1," for example, in order to signify an invalid assignment. This may be used as an indication of SPS release. Table 2 below depicts an exemplary bit assignment under DCI format 0 for a UL SPS release.

TABLE 2

| SPS Release Message Fields DCI format 0 | |
|---|---|
| TPC command for scheduled PUSCH | set to "00" |
| Cyclic Shift DMRS | set to "000" |
| Modulation and coding scheme and redundancy version | set to "11111" |
| Resource block assignment and hopping resource allocation | set to all 1's |

When contention-based SPS is employed, different DMRS cyclic shifts may be used by each UE 115 that is assigned a set of UL resources. This may enable a base station 105 to identify a transmission from a particular UE 115 when several UEs 115 are attempting to use the UL resources. This may be beneficial during instances when collision of packets occur or may be likely to occur. A DMRS cyclic shift for each UE 115 may be configured dynamically (e.g., in an SPS activation message) or using RRC signaling. So in some examples, a DMRS cyclic shift field of a DCI format 0 message may be used to indicate a cyclic shift that a given UE 115 should use to support content-based SPS.

By way of example, a mapping table like the one shown in Table 3 below may be used to communicate a DMRS cyclic shift. For instance, a 3-bit DMRS cyclic shift field of a DCI message may be set as indicated in Table 3. Each setting may correspond to a particular DMRS cyclic shift parameter, which a UE 115 that receives the DCI message may employ. In the case of a 3-bit scheme, 8 cyclic shift values may be addressed.

TABLE 3

| Cyclic Shift field in DCI format 0 | DMRS Cyclic Shift Parameter |
|---|---|
| 000 | 0 |
| 001 | 6 |
| 010 | 3 |
| 011 | 4 |
| 100 | 2 |
| 101 | 8 |
| 110 | 10 |
| 111 | 9 |

DMRS Cyclic Shift Signaling

In another example involving 4-bits, up to 12 cyclic shift values may be defined in a similar manner as described above. RRC configured root sequences may also be semi-statically configured or dynamically indicated for SPS PUSCH, which may increase multiplexing capability at the expense of increased complexity.

In a contention-based scheme, UEs 115-a and 115-b (and other UEs 115) may also be scheduled with the same PHICH resource. That is, since DMRS cyclic shift is not involved in PHICH resource derivation for UL SPS, UEs with the same starting PRB may map to the same PHICH resource. So in some cases, one or more of the UEs 115 may skip monitoring the PHICH.

For example, base station 105-a may explicitly indicate to UEs 115-a and 115-b whether or not to monitor PHICH for the UL SPS via a RRC configuration. Additionally or alternatively, base station 105-a may implicitly indicate if DMRS cyclic shift is configured by RRC for UL SPS, while still monitoring PHICH if DMRS cyclic shift is not configured for UL SPS. In some cases, threshold rules for SPS periodicity may be used to determine PHICH monitoring. For example, if SPS periodicity is less than 10 ms, no PHICH monitoring; otherwise, continue PHICH monitoring. Thus, UEs 115-a and 115-b may implicitly determine if PHICH monitoring should be skipped or not.

In another example, UEs 115-a and 115-b may monitor the same PHICH resource. For instance, for each UE 115 detected, base station 105-a may transmit a DCI using the corresponding SPS C-RNTI. In some cases, base station 105-a may set a PHICH value (e.g., ACK), to indicate to other UEs 115 that are not detected.

Alternatively, RRC-configured DMRS cyclic shift for PHICH resource derivation may be used. For example, if 3-bit is used for RRC-configured DMRS cyclic shift, the mapping table given below for the 3-bit DMRS cyclic shift in DCI format 0 may be used. In other cases, if 4-bit is used for RRC configured DM-RS cyclic shift, a different mapping table may be defined.

TABLE 4

PHICH Resource Derivation

| Cyclic shift for DM-RS | Offset for PHICH resource derivation |
|---|---|
| 000 | 0 |
| 001 | 1 |
| 010 | 2 |
| 011 | 3 |
| 100 | 4 |
| 101 | 5 |
| 110 | 6 |
| 111 | 7 |

In some cases, a UE to monitor uplink group transmit power control information in the UE-specific search space over the common search space. DCI format 3/3A, used for uplink transmit power control may be transmitted as frequently as possible. However, in some cases, a common search space carrying DCI format 3/3A may be crowded. In such cases, a UE 115 may monitor 3/3A in the UE-specific search space if it is configured with UL SPS. For example, when the UL SPS has a periodicity of less than 10 ms, or when the UL SPS has a RRC configured DMRS cyclic shift. The aggregation levels for DCI 3/3A in UE-specific search space may then be limited to, e.g., level 4 and level 8.

In some cases, SPS may be configured in the primary cell (PCell) or primary-secondary cell (PScell). In some cases, such as for low data rates, contention-based PUSCH operation may be sufficient to be enabled in PCell or PScell. In the case of a dual connectivity configuration, when contention-based PUSCH is enabled in both PCell and PSCell, selection process for choosing between the two may involve resorting to UE implementation, or establishing standardized rules, which may help determine if the PCell or PSCell should be selected. For example, a PCell may be given a higher priority over the PSCell. Alternatively, a cell may be selected because it provides the earliest SPS opportunity.

By way of example, cell selection may also depend on a payload size, a resource allocation size, a modulation scheme, a coding rate, a periodicity of SPS, or a combination thereof. For instance, PCell SPS PUSCH may use 1 resource block, while PSCell SPS PUSCH may use 2 resource blocks. So if cell selection is based on payload size, for a payload size of 100 bits or less, PCell SPS may be picked; otherwise, a PSCell SPS may be selected.

A UE may transmit UCI on a PUSCH depending on whether the PUSCH is associated with individually granted resources (either SPS PUSCH or PUCCH) or contention-based resources. In some cases, UCI piggybacking on PUSCH may further depend on other parameters, e.g., whether or not parallel PUCCH transmission and PUSCH transmission are configured for the UE. For example, UCI may be piggybacked on (i.e., transmitted in conjunction with) the SPS PUSCH, if parallel PUCCH transmission and PUSCH transmission are not configured for the UE.

For contention-based PUSCH, the configured SPS PUSCH may be used in an opportunistic manner. For example, if UE 115-a does not have any UL traffic, it may not use the SPS PUSCH. If UE 115-a does have UL traffic, there is a possibility that the SPS resources 210-a may be shared by UE 115-b (e.g., SPS resources 210-a may be the same as or overlap with SPS resources 210-b). In some cases, UCI may or may not be sent on PUSCH depending on whether SPS PUSCH is contention based. If UE 115-a does not transmit the SPS PUSCH (even if it is configured for an uplink subframe), PUCCH or other PUSCH may be used to transmit UCI in the uplink subframe; if UE 115-a transmits the SPS PUSCH, the UCI may be transmitted on PUCCH or PUSCH in some cases.

The determination of whether to use individually granted resources or contention-based SPS PUSCH may depend on an explicit or implicit indication. For example, RRC signaling, including RRC signaling received during configuration, may explicitly indicate that the SPS PUSCH is contention based. The RRC signaling may further indicate that the SPS PUSCH may not be intended to carry UCI. Alternatively, an implicit indication, for example, based on SPS periodicity (whether or not DMRS cyclic shift is configured by RRC, etc.) may be used. UCI handling may also depend on UCI type. For example, ACK/NACK may not be transmitted on the SPS PUSCH, while Channel State Information (CSI) may still be piggybacked on the SPS PUSCH.

TTI bundling, which may involve sending a transport block multiple times in consecutive subframes without waiting for HARQ ACK/NACK messages may be configured to improve UL coverage. In some cases, for small SPS periodicity. In such cases, TTI bundling may be limited to SPS periodicities greater than some threshold. For example, SPS periodicities of 1 ms or 2 ms may not support TTI bundling, while larger periodicities may. Or in one example, if SPS periodicity is greater than 10 ms, UL SPS may be configured simultaneously with TTI bundling.

HARQ responses, which UEs 115-a and 115-b may use to provide feedback on whether or not a particular DL transmission was received, may be modified to support UL SPS activation and release. For example, for a DL association set (i.e., a set of DL subframes for which HARQ feedback is sent in a comment UL subframe), there may be constraints imposed on UL SPS activation and release. For instance, a system may impose a constraint that, for a given DL association set, there may be SPS activation or release, but not more than one SPS activation, or not more than one SPS release, or not more than one of them.

In some other cases, scheduling constraints may ensure that a scheduling request (SR) is not configured in the same cell group as the UL SPS. However, if SR is configured in the same cell group, UL SPS activation or release may be sent in a DL subframe that may not require HARQ feedback in a same uplink subframe configured for SR. In some examples, when PUCCH format 3, 4, or 5 is configured for a UE, having a dedicated bit for UL SPS activation or release may be employed. The dedicated bit for UL SPS activation or release may be in addition to other dedicated bits, such as a bit indicative of SR in a given PUCCH format.

In some cases, UEs 115-a and 115-b may not send a response when SPS is activated or deactivated. For example, a feedback process in an activation/deactivation chain may allow ACK/NACK to be in response to UL in addition to DL transmissions.

Figure 3:
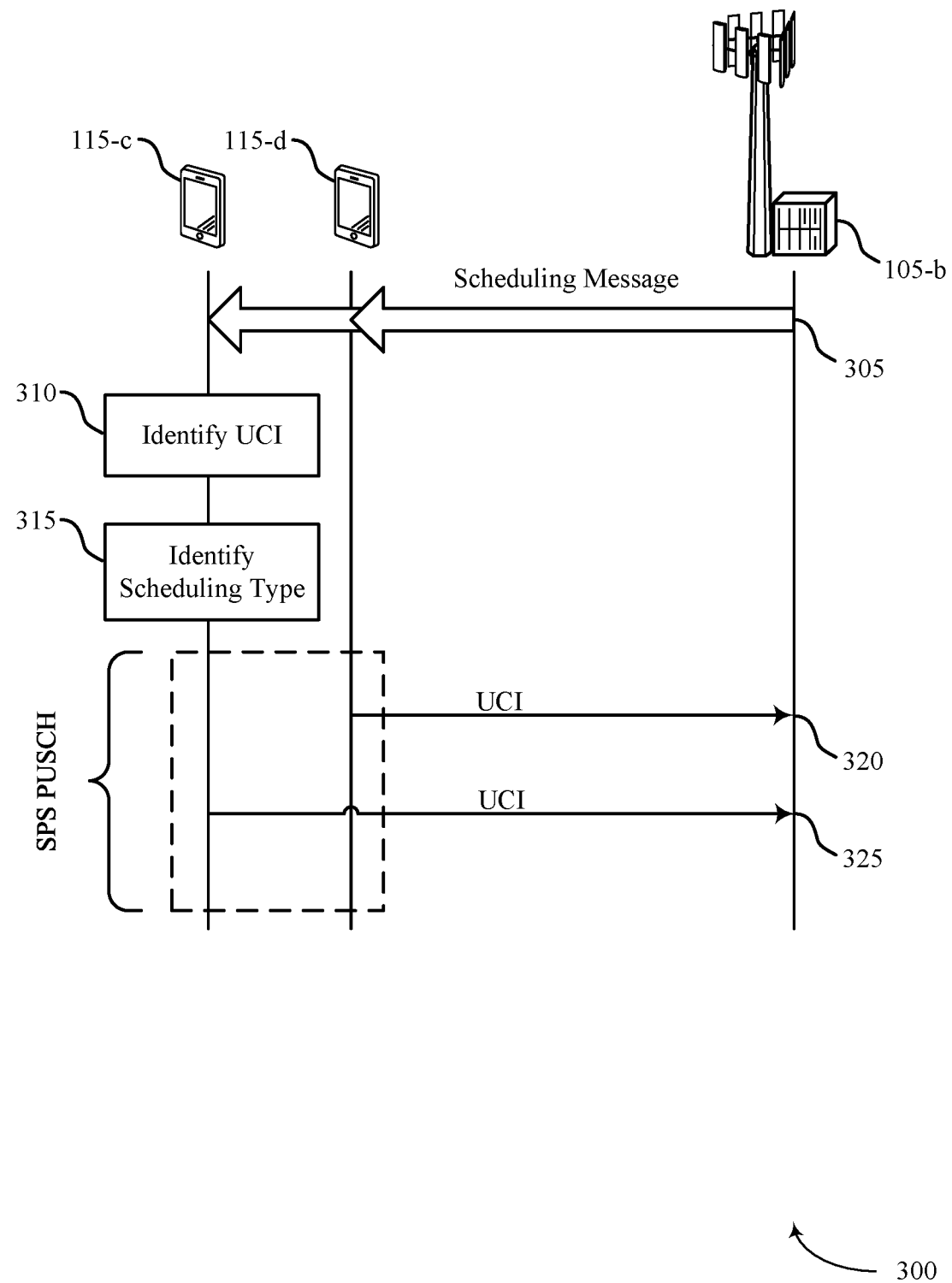
FIG. 3 illustrates an example of a process flow in a system that supports contention-based PUSCH in accordance with aspects of the present disclosure.

FIG. 3 illustrates an example of a process flow 300 for contention-based PUSCH in accordance with various aspects of the present disclosure. Process flow 300 may include base station 105-b and UEs 115-c and 115-d, which may be examples of the corresponding devices described with reference to FIG. 1-2. Process flow 300 may represent an example in which base station 105-b schedules both UE 115-c and UE 115-d with UL resources (e.g., SPS PUSCH) for transmitting UCI.

At step 305, base station 105-c may transmit a scheduling message to each of UE 115-c and UE 115-d. For example, the scheduling message may be a grant for a UL channel and/or an activation message. That is, the scheduled UL resources may be either individually granted or contention based.

At step 310, UE 115-c (and UE 115-d, not shown) may identify UCI to transmit during a subframe. At step 315, UE 115-c (and UE 115-d, not shown) may identify as a scheduling type for the UL channel. For example, UE 115-c and UE 115-d may determine whether granted SPS PUSCH resources are contention based.

UE 115-c and UE 115-d may then transmit the UCI at steps 320 and step 325, respectively. If the UCI is transmitted using contention based SPS PUSCH, UE 115-c and UE 115-d may use different DMRS cyclic shifts, which may enable base station 105-c to identify the source of transmission.

In some cases, UE 115-c and UE 115-d may also determine that that PHICH monitoring is disabled for the SPS and refrain from monitoring a PHICH based at least in part on the determination that PHICH monitoring is disabled. In some cases, UE 115-c and UE 115-d may receive a PHICH monitoring indication in an radio resource control (RRC) configuration message, wherein the determination that PHICH monitoring is disabled is based at least in part on the PHICH monitoring indication.

Figure 4:
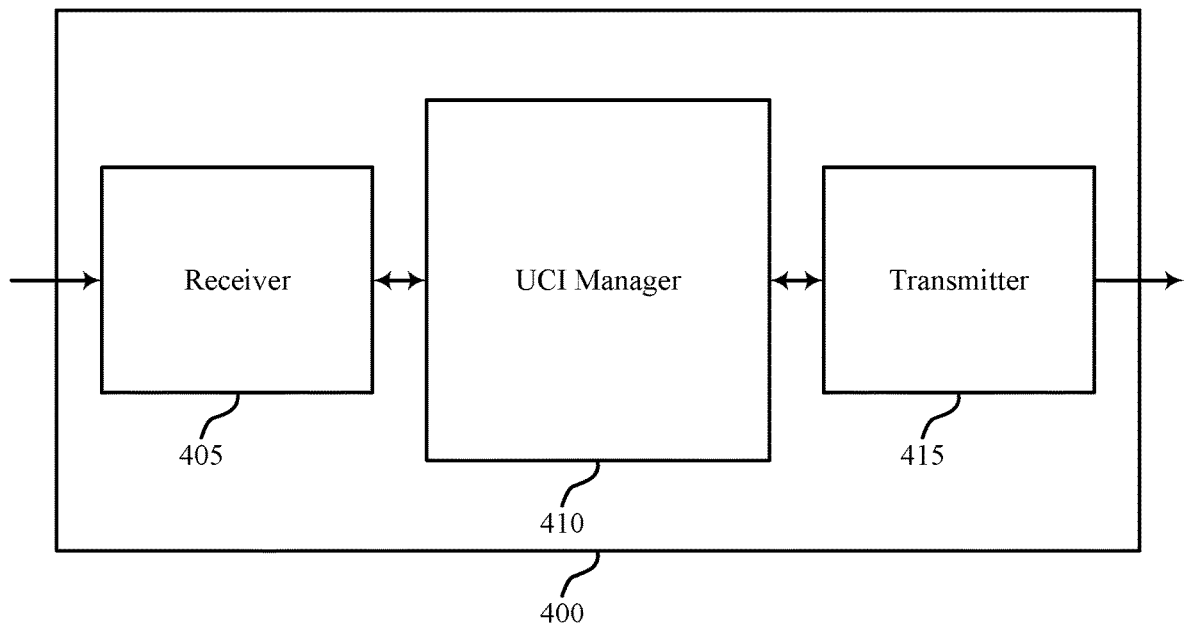
FIGS. 4 through 6 show block diagrams of a wireless device or devices that support contention-based PUSCH in accordance with aspects of the present disclosure.

FIG. 4 shows a block diagram of a wireless device 400 that supports contention-based PUSCH in accordance with various aspects of the present disclosure. Wireless device 400 may be an example of aspects of a UE 115 described with reference to FIGS. 1 and 2. Wireless device 400 may include receiver 405, UCI manager 410, and transmitter 415. Wireless device 400 may also include a processor. Each of these components may be in communication with one another.

The receiver 405 may receive information such as packets, user data, or control information associated with various information channels (e.g., control channels, data channels, and information related to contention-based PUSCH, etc.). Information may be passed on to other components of the device. The receiver 405 may be an example of aspects of the transceiver 725 described with reference to FIG. 7.

The UCI manager 410 may identify UL control information (UCI) to transmit during a subframe, identify a scheduling type for a UL channel during the subframe, where the scheduling type comprises a contention-based scheduling type or a non-contention-based scheduling type, and determine whether to transmit the UCI on the UL channel based on the scheduling type. The UCI manager 410 may determine to refrain from transmitting (i.e., not transmit) the UCI on the UL channel based on the scheduling type. The UCI manager 410 may also be an example of aspects of the UCI manager 705 described with reference to FIG. 7.

The transmitter 415 may transmit signals received from other components of wireless device 400. In some examples, the transmitter 415 may be collocated with a receiver in a transceiver module. For example, the transmitter 415 may be an example of aspects of the transceiver 725 described with reference to FIG. 7. The transmitter 415 may include a single antenna, or it may include several antennas.

Figure 5:
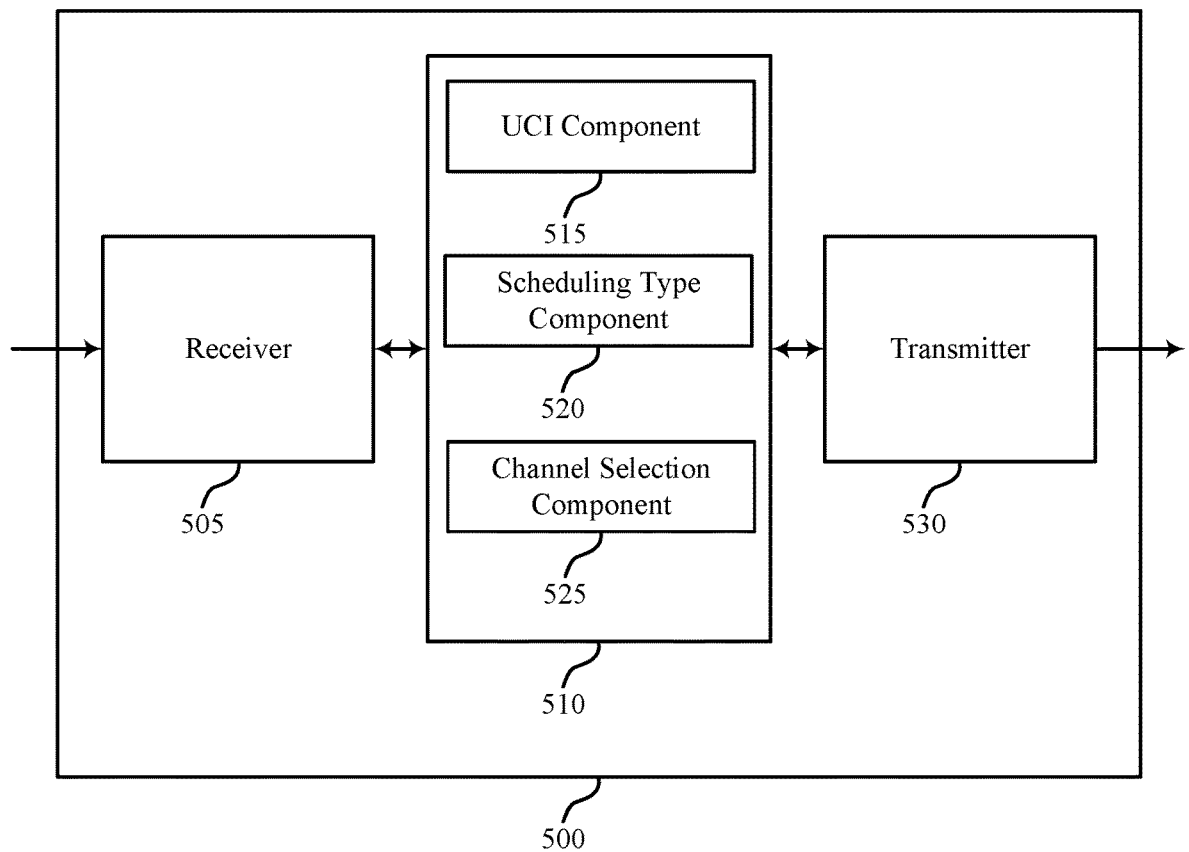

FIG. 5 shows a block diagram of a wireless device 500 that supports contention-based PUSCH in accordance with various aspects of the present disclosure. Wireless device 500 may be an example of aspects of a wireless device 400 or a UE 115 described with reference to FIGS. 1, 2 and 4. Wireless device 500 may include receiver 505, UCI manager 510, and transmitter 530. Wireless device 500 may also include a processor. Each of these components may be in communication with each other.

The receiver 505 may receive information which may be passed on to other components of the device. The receiver 505 may also perform the functions described with reference to the receiver 405 of FIG. 4. The receiver 505 may be an example of aspects of the transceiver 725 described with reference to FIG. 7.

The UCI manager 510 may be an example of aspects of UCI manager 410 described with reference to FIG. 4. The UCI manager 510 may include UCI component 515, scheduling type component 520, and channel selection component 525. The UCI manager 510 may be an example of aspects of the UCI manager 705 described with reference to FIG. 7.

The UCI component 515 may identify UL control information (UCI) to transmit during a subframe. The scheduling type component 520 may identify a scheduling type for a UL channel during the subframe, where the scheduling type comprises a contention-based scheduling type or a non-contention-based scheduling type.

The channel selection component 525 may determine whether to transmit the UCI on the UL channel is based on an information type of the UCI, transmit the UCI on a different UL channel based on the information type of the UCI being HARQ feedback, transmit the UCI on the UL channel based on the information type of the UCI being CSI, transmit the UCI on the UL channel based on the contention procedure and on the determination, and determine whether to transmit the UCI on the UL channel based on the scheduling type. The channel selection component 525 may determine to refrain from transmitting the UCI on the UL channel based on the scheduling type. In some cases, the different UL channel is at least one of a control channel or a data channel. In some cases, the different UL channel is located at a same carrier as the UL channel. In other examples, the different UL channel is located at a different carrier different than the UL channel.

The transmitter 530 may transmit signals received from other components of wireless device 500. In some examples, the transmitter 530 may be collocated with a receiver in a transceiver module. For instance, the transmitter 530 may be an example of aspects of the transceiver 725 described with reference to FIG. 7. The transmitter 530 may utilize a single antenna, or it may utilize several antennas.

Figure 6:
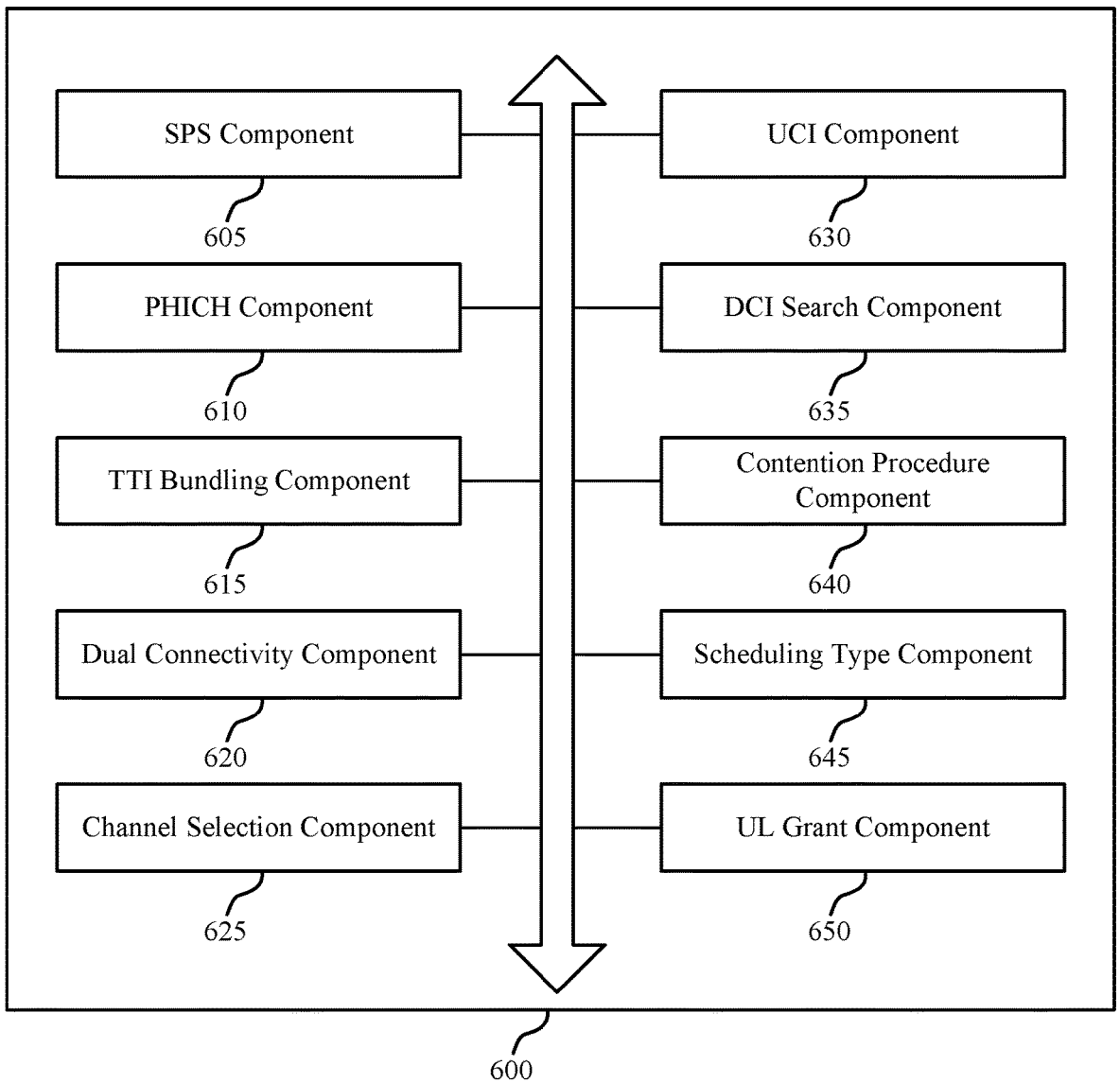

FIG. 6 shows a block diagram of a UCI manager 600 which may be an example of the corresponding component of wireless device 400 or wireless device 500. That is, UCI manager 600 may be an example of aspects of UCI manager 410 or UCI manager 510 described with reference to FIGS. 4 and 5. The UCI manager 600 may also be an example of aspects of the UCI manager 705 described with reference to FIG. 7.

The UCI manager 600 may include SPS component 605, PHICH component 610, TTI bundling component 615, dual connectivity component 620, channel selection component 625, UCI component 630, DCI search component 635, contention procedure component 640, scheduling type component 645 and UL grant component 650. Each of these modules may communicate, directly or indirectly, with one another (e.g., via one or more buses).

The SPS component 605 may receive at least one of a configuration or an activation message for a semi-persistent scheduling (SPS) of the UL channel, where the scheduling type is identified based on the SPS, and receive a release message for the SPS. In some cases, the SPS of the UL channel is configured for a PCell of a PUCCH group.

The PHICH component 610 may determine that physical HARQ indicator channel (PHICH) monitoring is disabled for the SPS and cause UCI manager 600 (or the device of which it is a part) to refrain from monitoring a PHICH based on the determination that PHICH monitoring is disabled. The PHICH component 610 may receive a PHICH monitoring indication in an RRC configuration message, and the determination that PHICH monitoring is disabled may be based on the PHICH monitoring indication. The PHICH component 610 may also identify a set of PHICH resources for the SPS based on a DMRS cyclic shift, and monitor the set of PHICH resources. In some cases, the determination that PHICH monitoring is disabled is based on whether a DMRS cyclic shift is configured.

The TTI bundling component 615 may identify a periodicity of the SPS and determine whether TTI bundling is supported based on the periodicity of the SPS.

The dual connectivity component 620 may identify a PUSCH selection parameter for a dual connectivity configuration, and select a cell of the dual connectivity configuration based on the PUSCH selection parameter, where the UL channel is associated with the selected cell.

The channel selection component 625 may determine whether to transmit the UCI on the UL channel is based on an information type of the UCI. The channel selection component 625 may determine to refrain from transmitting the UCI on the UL channel based on the scheduling type. The channel selection component 625 may also transmit (or cause to be transmitted) the UCI on a different UL channel based on the information type of the UCI being HARQ feedback. In some cases, the channel selection component 625 may transmit (or cause to be transmitted) the UCI on the UL channel based on the information type of the UCI being CSI. Additionally or alternatively, the channel selection component 625 may transmit (or cause to be transmitted) the UCI on the UL channel based on the contention procedure and on the determination; it may also determine whether to transmit the UCI on the UL channel based on the scheduling type.

The UCI component 630 may identify UL control information (UCI) to transmit during a subframe. The DCI search component 635 may identify one or more DL control information (DCI) search parameters based on the scheduling type, and monitor a UE-specific search space based on the one or more DCI search parameters.

The contention procedure component 640 may receive a RRC configuration message indicating the scheduling type, receive a configuration of a DMRS cyclic shift for the scheduling type, and perform a contention procedure for the UL channel based on the scheduling type.

The scheduling type component 645 may identify a scheduling type for a UL channel during the subframe. The scheduling type may a contention-based scheduling type or a non-contention-based scheduling type, as described herein. The UL grant component 650 may receive a grant for the UL channel, and the scheduling type may be identified based on the grant.

Figure 7:
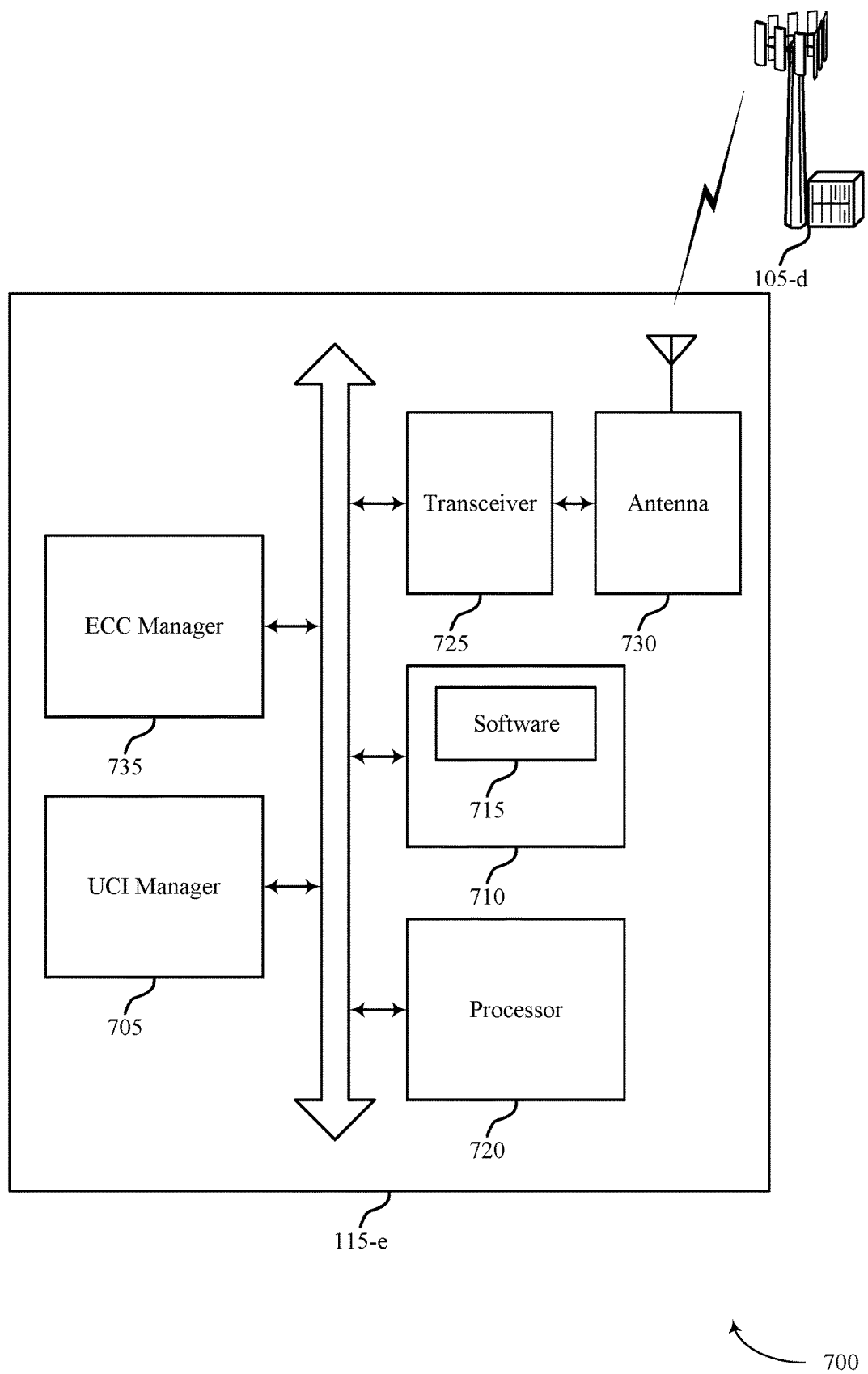
FIG. 7 illustrates a block diagram of a system including a UE that supports contention-based PUSCH in accordance with aspects of the present disclosure.

FIG. 7 shows a diagram of a system 700 including a device that supports contention-based PUSCH in accordance with various aspects of the present disclosure. For example, system 700 may include UE 115-e, which may be an example of a wireless device 400, a wireless device 500, or a UE 115 as described with reference to FIGS. 1, 2 and 4 through 6.

UE 115-e may also include UCI manager 705, memory 710, processor 720, transceiver 725, and antenna 730, and ECC manager 735. Each of these modules may communicate, directly or indirectly, with one another (e.g., via one or more buses). The UCI manager 705 may be an example of a UCI manager as described with reference to FIGS. 4 through 6.

The memory 710 may include random access memory (RAM) and read only memory (ROM). The memory 710 may store computer-readable, computer-executable software including instructions that, when executed, cause the processor, and thus UE 115-e, to perform various functions described herein (e.g., contention-based PUSCH, etc.).

In some cases, the software 715 may not be directly executable by the processor but may cause a computer (e.g., when compiled and executed) to perform functions described herein. The processor 720 may include an intelligent hardware device, (e.g., a central processing unit (CPU), a microcontroller, an application specific integrated circuit (ASIC), etc.)

The transceiver 725 may communicate bi-directionally, via one or more antennas, wired, or wireless links, with one or more networks, as described above. For example, the transceiver 725 may communicate bi-directionally with a base station 105 or a UE 115. The transceiver 725 may also include a modem to modulate the packets and provide the modulated packets to the antennas for transmission, and to demodulate packets received from the antennas. In some cases, the wireless device may include a single antenna 730. However, in some cases the device may have more than one antenna 730, which may be capable of concurrently transmitting or receiving multiple wireless transmissions.

The ECC manager 735 may enable operations using enhanced component carriers (eCCs) such as communication using shared or unlicensed spectrum, using reduced TTIs or subframe durations, or using a large number of component carriers.

Figure 8:
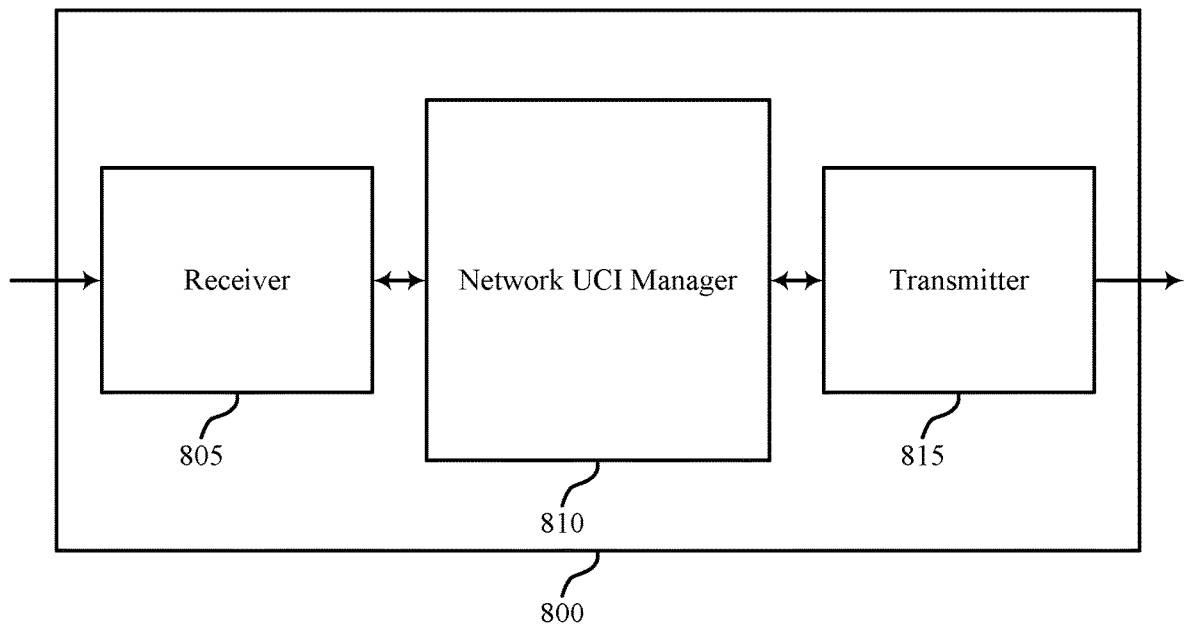
FIGS. 8 through 10 show block diagrams of a wireless device or devices that support contention-based PUSCH in accordance with aspects of the present disclosure.

FIG. 8 shows a block diagram of a wireless device 800 that supports contention-based PUSCH in accordance with various aspects of the present disclosure. Wireless device 800 may be an example of aspects of a base station 105 described with reference to FIGS. 1 and 2. Wireless device 800 may include receiver 805, network UCI manager 810, and transmitter 815. Wireless device 800 may also include a processor. Each of these components may be in communication with each other.

The receiver 805 may receive information such as packets, user data, or control information associated with various information channels (e.g., control channels, data channels, and information related to contention-based PUSCH, etc.). Information may be passed on to other components of the device. The receiver 805 may be an example of aspects of the transceiver 1125 described with reference to FIG. 11.

The network UCI manager 810 may transmit a control message to a UE that indicates a UL control information (UCI) handling configuration, identify a scheduling type for a UL channel during a subframe, where the scheduling type comprises a contention-based scheduling type or a non-contention-based scheduling type, and receive UCI from the UE, where the UCI is transmitted based on the UCI handling configuration and the scheduling type. The network UCI manager 810 may also be an example of aspects of the network UCI manager 1105 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. The transmitter 815 may include a single antenna, or it may include a plurality of antennas.

Figure 9:
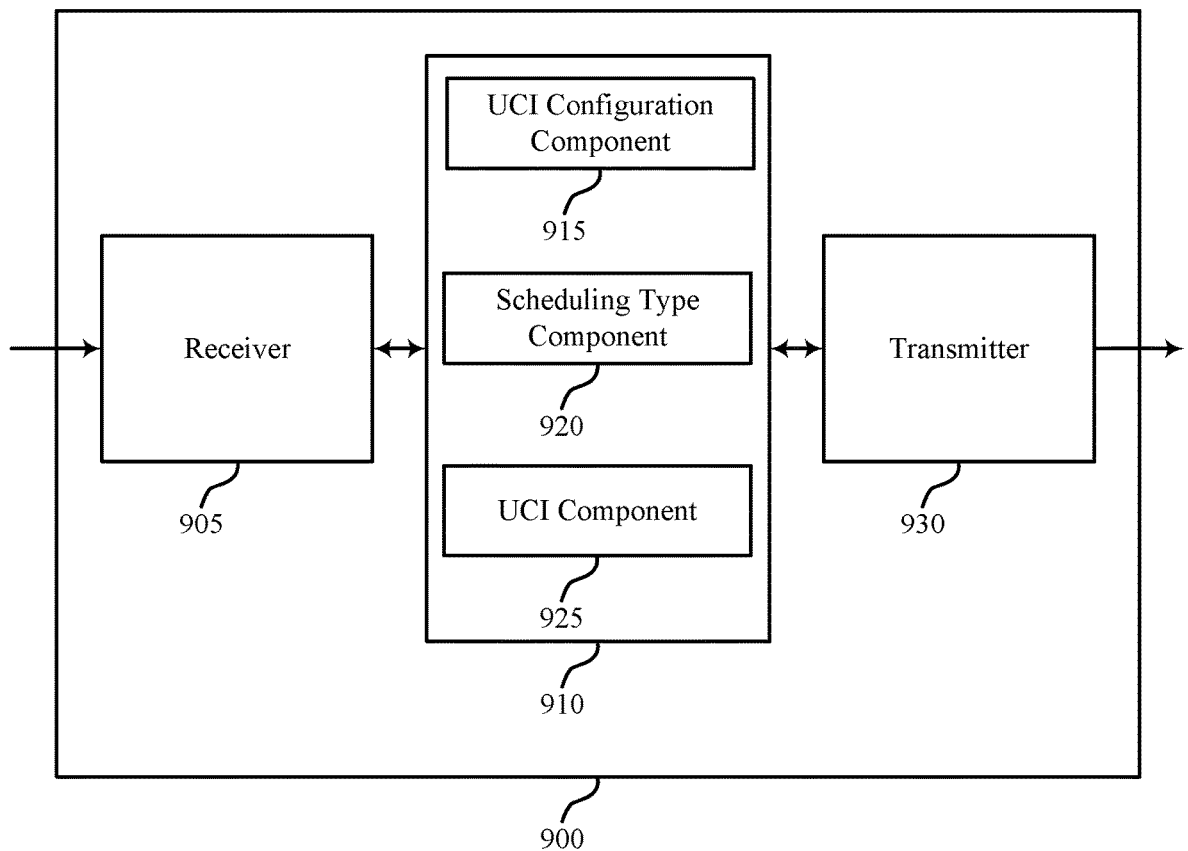

FIG. 9 shows a block diagram of a wireless device 900 that supports contention-based PUSCH in accordance with various aspects of the present disclosure. Wireless device 900 may be an example of aspects of a wireless device 800 or a base station 105 described with reference to FIGS. 1, 2 and 8. Wireless device 900 may include receiver 905, network UCI manager 910, and transmitter 930. Wireless device 900 may also include a processor. Each of these components may be in communication with one another.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11.

The network UCI manager 910 may be an example of aspects of network UCI manager 810 described with reference to FIG. 8. The network UCI manager 910 may include UCI configuration component 915, scheduling type component 920, and UCI component 925. The network UCI manager 910 may be an example of aspects of the network UCI manager 1105 described with reference to FIG. 11.

The UCI configuration component 915 may transmit a control message to a UE that indicates a UL control information (UCI) handling configuration. The scheduling type component 920 may identify a scheduling type for a UL channel during a subframe, where the scheduling type comprises a contention-based scheduling type or a non-contention-based scheduling type.

The UCI component 925 may receive UCI from the UE, where the UCI is transmitted based on the UCI handling configuration and the scheduling type, receive the UCI on a different UL channel based on the information type of the UCI being HARQ feedback, and receive the UCI on the UL channel based on the information type of the UCI being CSI. In some cases, the UCI is transmitted on the UL channel based on an information type of the UCI. In some cases, the different UL channel is at least one of a control channel or a data channel. The different UL channel may be located at a same carrier as the UL channel. Or, the different UL channel may be located at a different carrier different than the UL channel.

The transmitter 930 may transmit signals received from other components of wireless device 900. In some examples, the transmitter 930 may be collocated with a receiver in a transceiver module. For example, the transmitter 930 may be an example of aspects of the transceiver 1125 described with reference to FIG. 11. The transmitter 930 may utilize a single antenna, or it may utilize several antennas.

Figure 10:
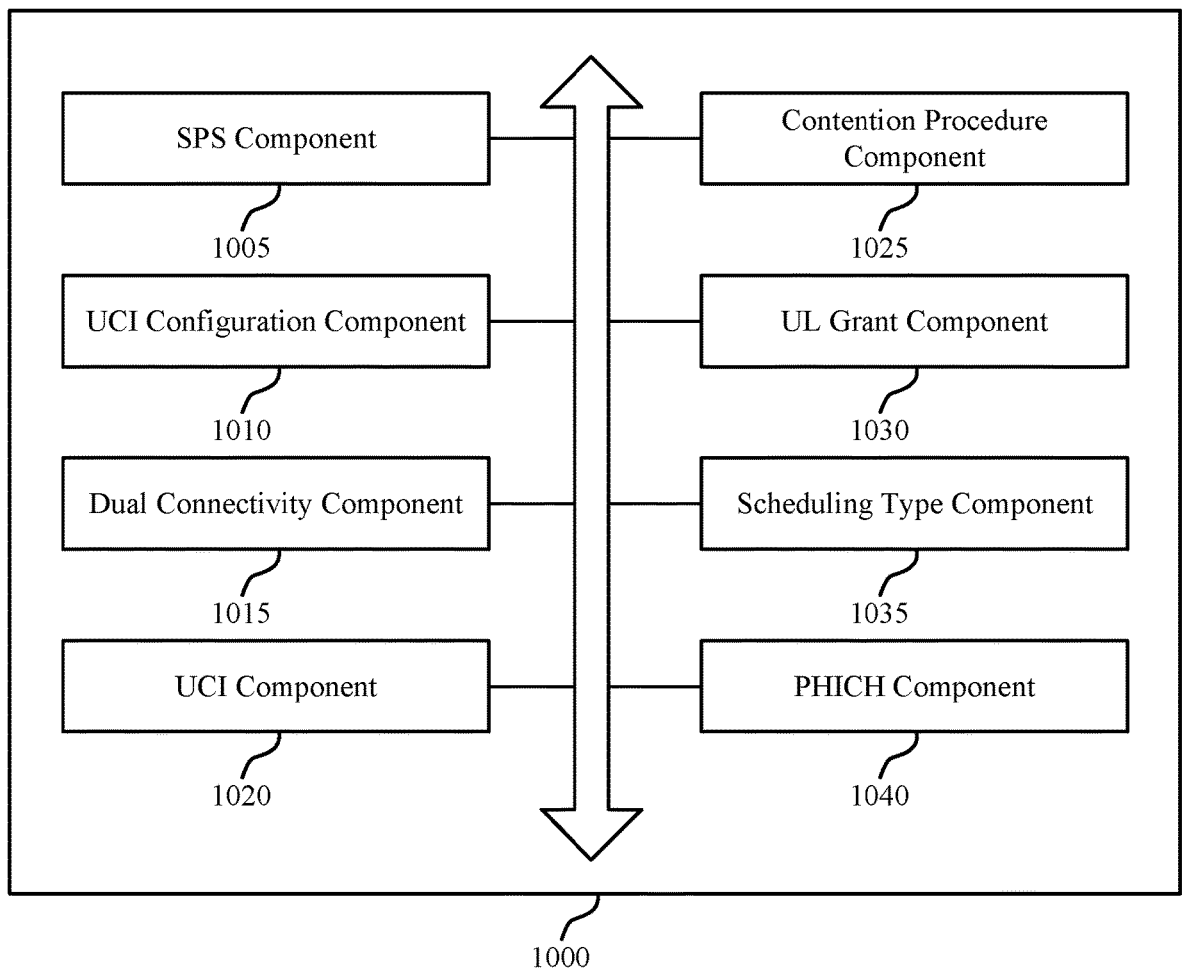

FIG. 10 shows a block diagram of a network UCI manager 1000 which may be an example of the corresponding component of wireless device 800 or wireless device 900. That is, network UCI manager 1000 may be an example of aspects of network UCI manager 810 or network UCI manager 910 described with reference to FIGS. 8 and 9. The network UCI manager 1000 may also be an example of aspects of the network UCI manager 1105 described with reference to FIG. 11.

The network UCI manager 1000 may include SPS component 1005, UCI configuration component 1010, dual connectivity component 1015, UCI component 1020, contention procedure component 1025, UL grant component 1030, scheduling type component 1035, and PHICH component 1040. Each of these modules may communicate, directly or indirectly, with one another (e.g., via one or more buses).

The SPS component 1005 may transmit at least one of a configuration or an activation message for a semi-persistent scheduling (SPS) of the UL channel A scheduling type for transmissions on the UL channel may be based on the SPS. The SPS component 1005 may transmit a release message for the SPS. In some cases, the SPS of the UL channel is configured for a PCell of a PUCCH group. The UCI configuration component 1010 may transmit a control message to a UE that indicates a UL control information (UCI) handling configuration.

The dual connectivity component 1015 may identify a PUSCH selection parameter for a dual connectivity configuration and select a cell of the dual connectivity configuration based on the PUSCH selection parameter. The UL channel may be associated with the selected cell.

The UCI component 1020 may receive (or caused to be received) UCI from the UE on the UL channel. The UCI may, for example, be transmitted based on the UCI handling configuration and the scheduling type. In some examples, the UCI component 1020 receives (or causes to be received) the UCI on a different UL channel based on the information type of the UCI being HARQ feedback. Additionally or alternatively, the UCI component 1020 may receive (or cause to be received) the UCI on the UL channel based on the information type of the UCI being CSI.

The contention procedure component 1025 may transmit (or cause to be transmitted) a RRC configuration message indicating the scheduling type, and it transmit (or cause to be transmitted) a configuration message indicating a DMRS cyclic shift for the scheduling type. The UL grant component 1030 may transmit (or cause to be transmitted) a grant for the UL channel. The scheduling type is, in some examples, based on the grant.

The scheduling type component 1035 may identify a scheduling type for a UL channel during a subframe. The scheduling type may include a contention-based scheduling type or a non-contention-based scheduling type. The PHICH component 1040 may transmit (or cause to be transmitted) a control message indicating that physical HARQ indicator channel (PHICH) monitoring is disabled for the SPS.

Figure 11:
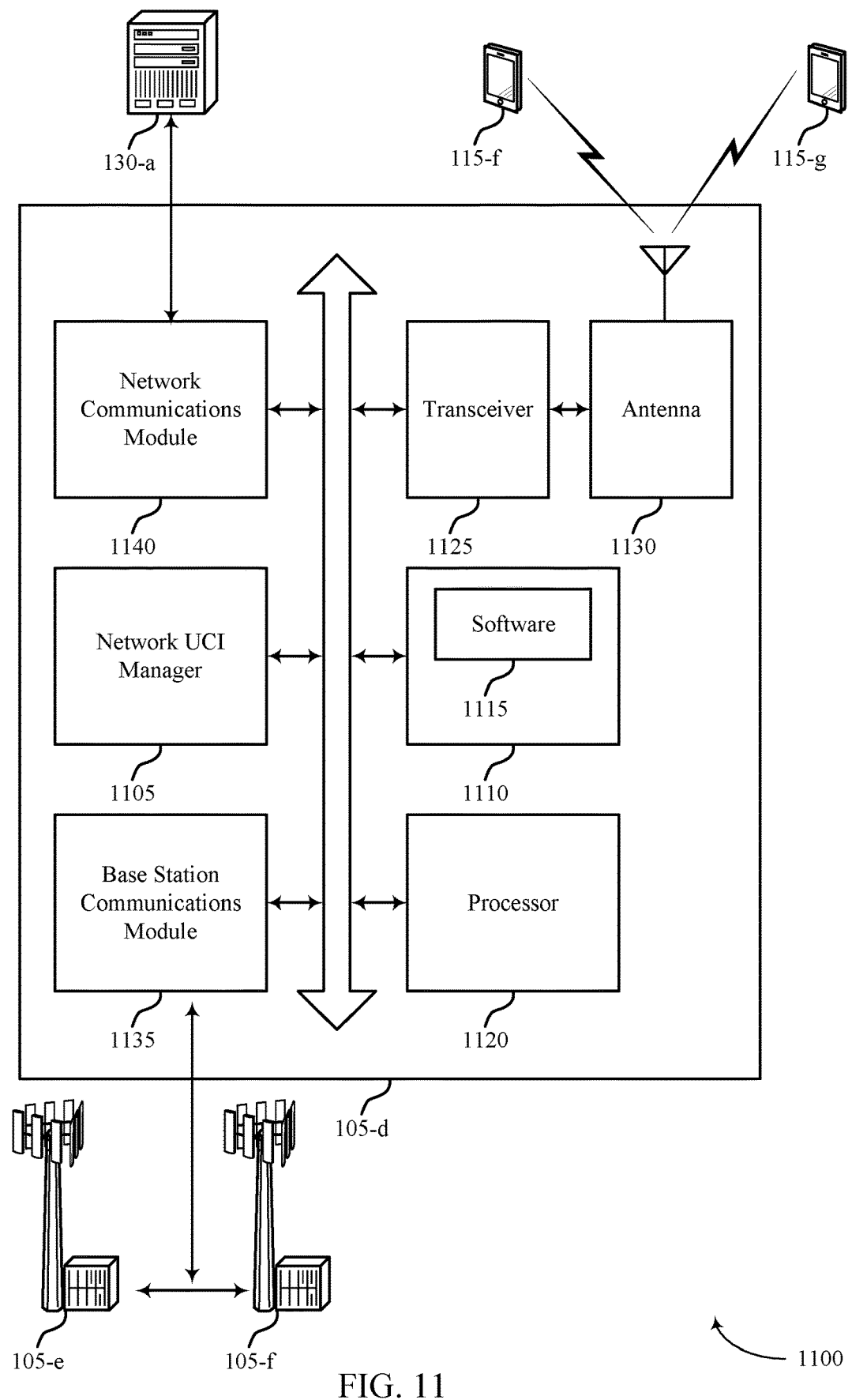
FIG. 11 illustrates a block diagram of a system including a base station that supports contention-based PUSCH in accordance with aspects of the present disclosure.

FIG. 11 shows a diagram of a wireless system 1100 that includes a device that supports contention-based PUSCH in accordance with various aspects of the present disclosure. For example, system 1100 may include base station 105-*d*, which may be an example of a wireless device 800, a wireless device 900, or a base station 105 as described with reference to FIGS. 1, 2 and 8 through 10. Base station 105-*d* may also include components for bi-directional voice and data communications including components for transmitting communications and components for receiving communications. For example, base station 105-*d* may communicate bi-directionally with one or more UEs 115.

Base station 105-*d* may also include network UCI manager 1105, memory 1110, processor 1120, transceiver 1125, antenna 1130, base station communications module 1135, and network communications module 1140. Each of these modules may communicate, directly or indirectly, with one another (e.g., via one or more buses). The network UCI manager 1105 may be an example of a network UCI manager as described with reference to FIGS. 8 through 10.

The memory 1110 may include RAM and ROM. The memory 1110 may store computer-readable, computer-executable software including instructions that, when executed, cause the processor to, and thus base station 105-*d* or a component of base station 105-*d*, to perform various functions described herein (e.g., contention-based PUSCH, etc.). In some cases, the software 1115 may not be directly executable by the processor but may cause a computer (e.g., when compiled and executed) to perform functions described herein. The processor 1120 may include an intelligent hardware device, (e.g., a CPU, a microcontroller, an ASIC, etc.)

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 730, which may be capable of concurrently transmitting or receiving multiple wireless transmissions.

The base station communications module 1135 may manage communications with other base station 105, and may include a controller or scheduler for controlling communications with UEs 115 in cooperation with other base stations 105. For example, the base station communications module 1135 may coordinate scheduling for transmissions to UEs 115 for various interference mitigation techniques such as beamforming or joint transmission. In some examples, base station communications module 1135 provides an X2 interface within an LTE/LTE-A wireless communication network technology to provide communication between base stations 105.

The network communications module 1140 may manage communications with the core network (e.g., via one or more wired backhaul links). For example, the network communications module 1140 may manage the transfer of data communications for client devices, such as one or more UEs 115.

Figure 12:
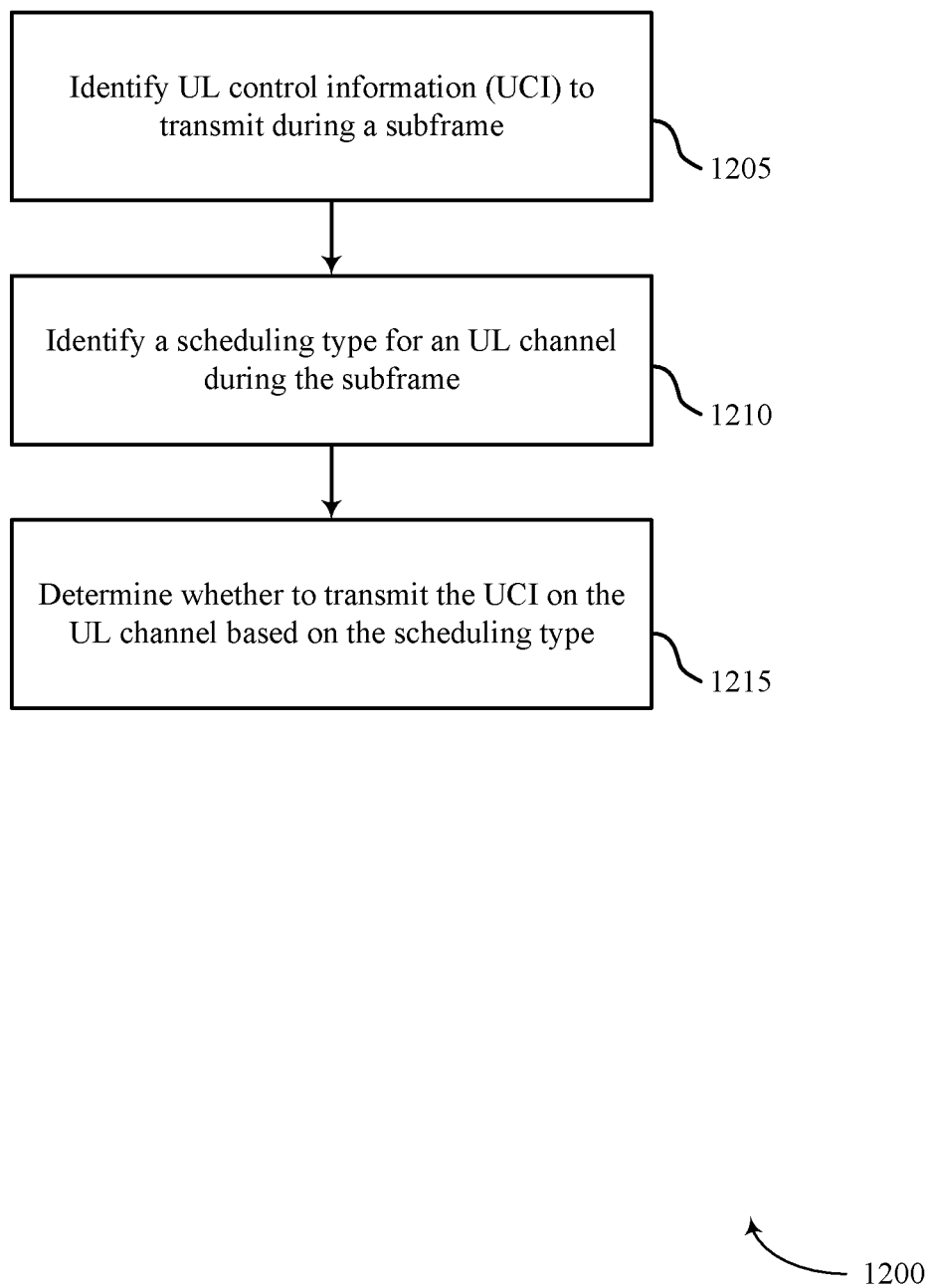
FIGS. 12 through 23 illustrate methods for contention-based PUSCH in accordance with aspects of the present disclosure.

FIG. 12 shows a flowchart illustrating a method 1200 for contention-based PUSCH in accordance with various aspects of the present disclosure. The operations of method 1200 may be implemented by a device such as a UE 115 or its components as described with reference to FIGS. 1 and 2. For example, the operations of method 1200 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1205, the UE 115 may identify UL control information (UCI) to transmit during a subframe as described above with reference to FIGS. 2 through 3. In certain examples, the operations of block 1205 may be performed by the UCI component as described with reference to FIGS. 5 and 6 or processor 720 described with reference to FIG. 7.

At block 1210, the UE 115 may identify a scheduling type for a UL channel during the subframe, as described above with reference to FIGS. 2 through 3. The scheduling type being a contention-based scheduling type or a non-contention-based scheduling type, for example. In certain examples, the operations of block 1210 may be performed by the scheduling type component as described with reference to FIGS. 5 and 6 or processor 720 described with reference to FIG. 7.

At block 1215, the UE 115 may determine whether to transmit the UCI on the UL channel based on the scheduling type as described above with reference to FIGS. 2 through 3. The method may include refraining from transmitting the UCI on the UL channel based on the scheduling type. In certain examples, the operations of block 1215 may be performed by the channel selection component as described with reference to FIGS. 5 and 6 or processor 720 described with reference to FIG. 7.

Figure 13:
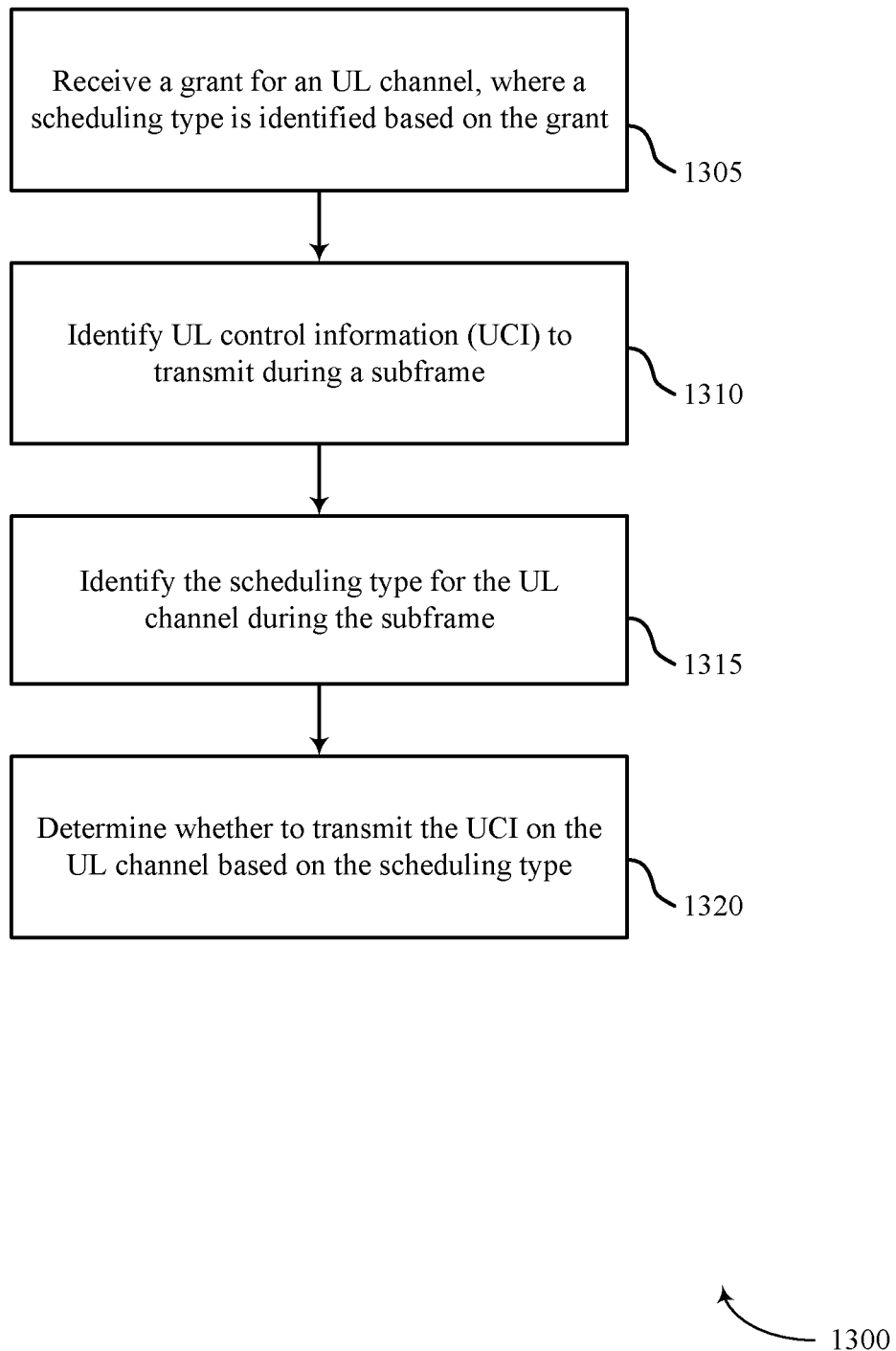

FIG. 13 shows a flowchart illustrating a method 1300 for contention-based PUSCH in accordance with various aspects of the present disclosure. The operations of method 1300 may be implemented by a device such as a UE 115 or its components as described with reference to FIGS. 1 and 2. For example, the operations of method 1300 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive a grant for the UL channel, where the scheduling type is identified based on the grant as described above with reference to FIGS. 2 through 3. In certain examples, the operations of block 1305 may be performed by the UL grant component as described with reference to FIGS. 5 and 6 or transceiver 725 and antenna 730 described with reference to FIG. 7.

At block 1310, the UE 115 may identify UL control information (UCI) to transmit during a subframe as described above with reference to FIGS. 2 through 3. In certain examples, the operations of block 1310 may be performed by the UCI component as described with reference to FIGS. 5 and 6 or processor 720 described with reference to FIG. 7.

At block 1315, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 1315 may be performed by the scheduling type component as described with reference to FIGS. 5 and 6 or processor 720 described with reference to FIG. 7.

At block 1320, the UE 115 may determine whether to transmit the UCI on the UL channel based on the scheduling type as described above with reference to FIGS. 2 through 3. In certain examples, the operations of block 1320 may be performed by the channel selection component as described with reference to FIGS. 5 and 6 or processor 720 described with reference to FIG. 7.

Figure 14:
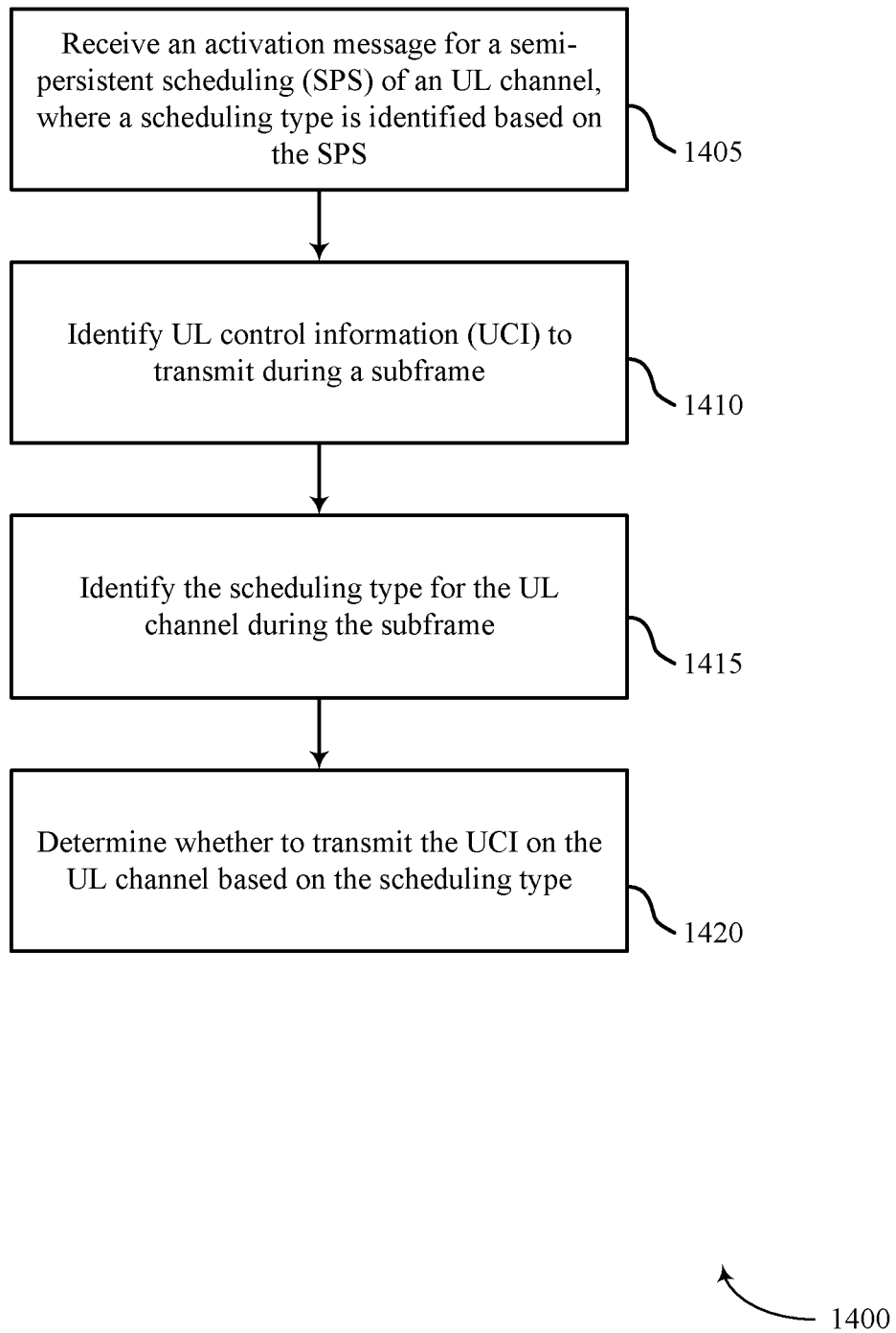

FIG. 14 shows a flowchart illustrating a method 1400 for contention-based PUSCH in accordance with various aspects of the present disclosure. The operations of method 1400 may be implemented by a device such as a UE 115 or its components as described with reference to FIGS. 1 and 2. For example, the operations of method 1400 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive at least one of a configuration or an activation message for a semi-persistent scheduling (SPS) of the UL channel, where the scheduling type is identified based on the SPS as described above with reference to FIGS. 2 through 3. In certain examples, the operations of block 1405 may be performed by the SPS component as described with reference to FIGS. 5 and 6 or transceiver 725 and antenna 730 described with reference to FIG. 7.

At block 1410, the UE 115 may identify UL control information (UCI) to transmit during a subframe as described above with reference to FIGS. 2 through 3. In certain examples, the operations of block 1410 may be performed by the UCI component as described with reference to FIGS. 5 and 6 or processor 720 described with reference to FIG. 7.

At block 1415, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 1415 may be performed by the scheduling type component as described with reference to FIGS. 5 and 6 or processor 720 described with reference to FIG. 7.

At block 1420, the UE 115 may determine whether to transmit the UCI on the UL channel based on the scheduling type as described above with reference to FIGS. 2 through 3. In certain examples, the operations of block 1420 may be performed by the channel selection component as described with reference to FIGS. 5 and 6 or processor 720 described with reference to FIG. 7.

Figure 15:
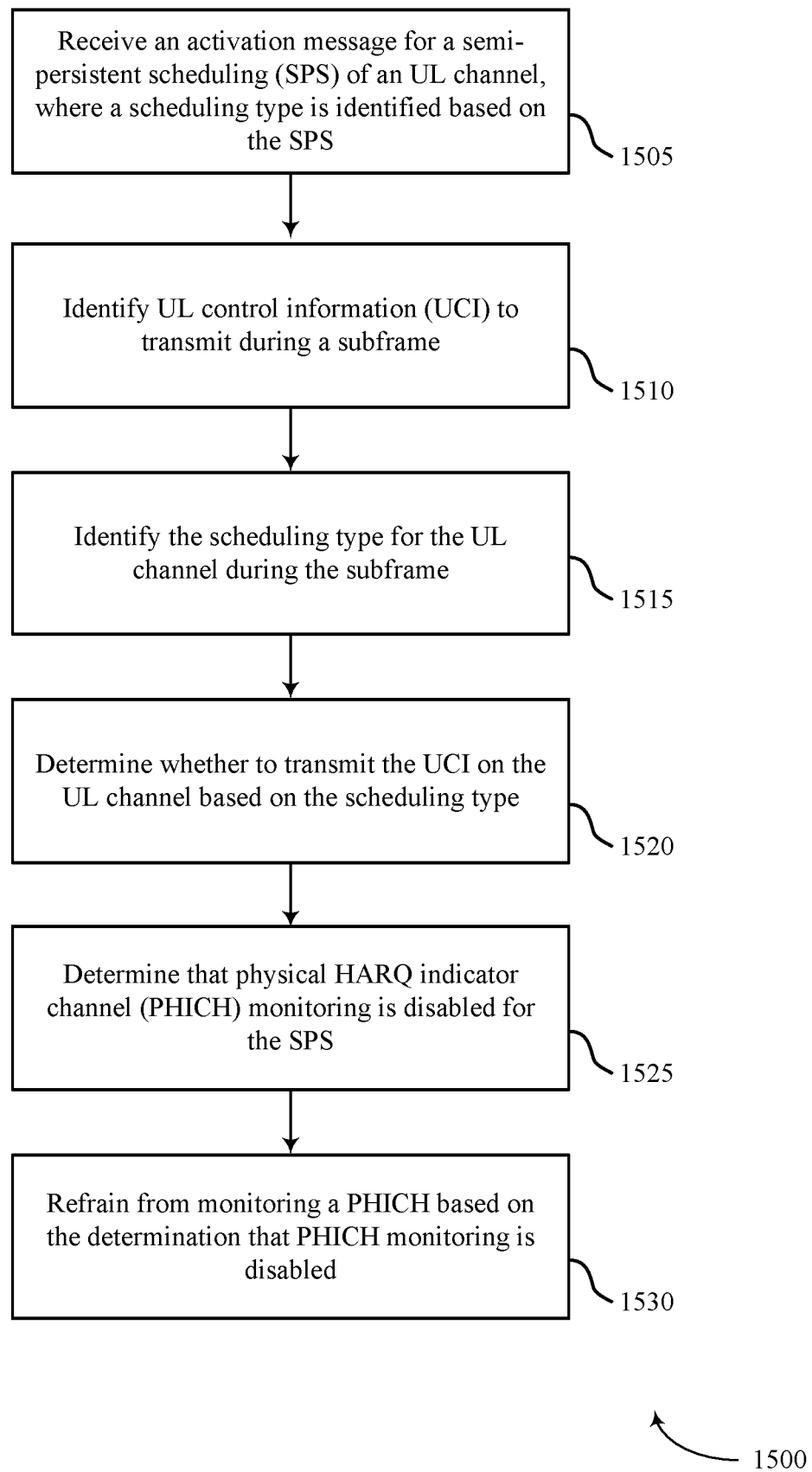

FIG. 15 shows a flowchart illustrating a method 1500 for contention-based PUSCH in accordance with various aspects of the present disclosure. The operations of method 1500 may be implemented by a device such as a UE 115 or its components as described with reference to FIGS. 1 and 2. For example, the operations of method 1500 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive at least one of a configuration or an activation message for a semi-persistent scheduling (SPS) of the UL channel, where the scheduling type is identified based on the SPS as described above with reference to FIGS. 2 through 3. In certain examples, the operations of block 1505 may be performed by the SPS component as described with reference to FIGS. 5 and 6 or transceiver 725 and antenna 730 described with reference to FIG. 7.

At block 1510, the UE 115 may identify UL control information (UCI) to transmit during a subframe as described above with reference to FIGS. 2 through 3. In certain examples, the operations of block 1510 may be performed by the UCI component as described with reference to FIGS. 5 and 6 or processor 720 described with reference to FIG. 7.

At block 1515, the UE 115 may identify a scheduling type for a UL channel during the subframe, described above with reference to FIGS. 2 through 3. The scheduling type may be a contention-based scheduling type or a non-contention-based scheduling type, for example. In certain examples, the operations of block 1515 may be performed by the scheduling type component as described with reference to FIGS. 5 and 6 or processor 720 described with reference to FIG. 7.

At block 1520, the UE 115 may determine whether to transmit the UCI on the UL channel based on the scheduling type as described above with reference to FIGS. 2 through 3. In certain examples, the operations of block 1520 may be performed by the channel selection component as described with reference to FIGS. 5 and 6 or processor 720 described with reference to FIG. 7.

At block 1525, the UE 115 may determine that physical HARQ indicator channel (PHICH) monitoring is disabled for the SPS as described above with reference to FIGS. 2 through 3. In certain examples, the operations of block 1525 may be performed by the PHICH component as described with reference to FIGS. 5 and 6 or processor 720 described with reference to FIG. 7.

At block 1530, the UE 115 may refrain from monitoring a PHICH based on the determination that PHICH monitoring is disabled as described above with reference to FIGS. 2 through 3. In certain examples, the operations of block 1530 may be performed by the PHICH component as described with reference to FIGS. 5 and 6 or processor 720, transceiver 725, and/or antenna 730 described with reference to FIG. 7.

Figure 16:
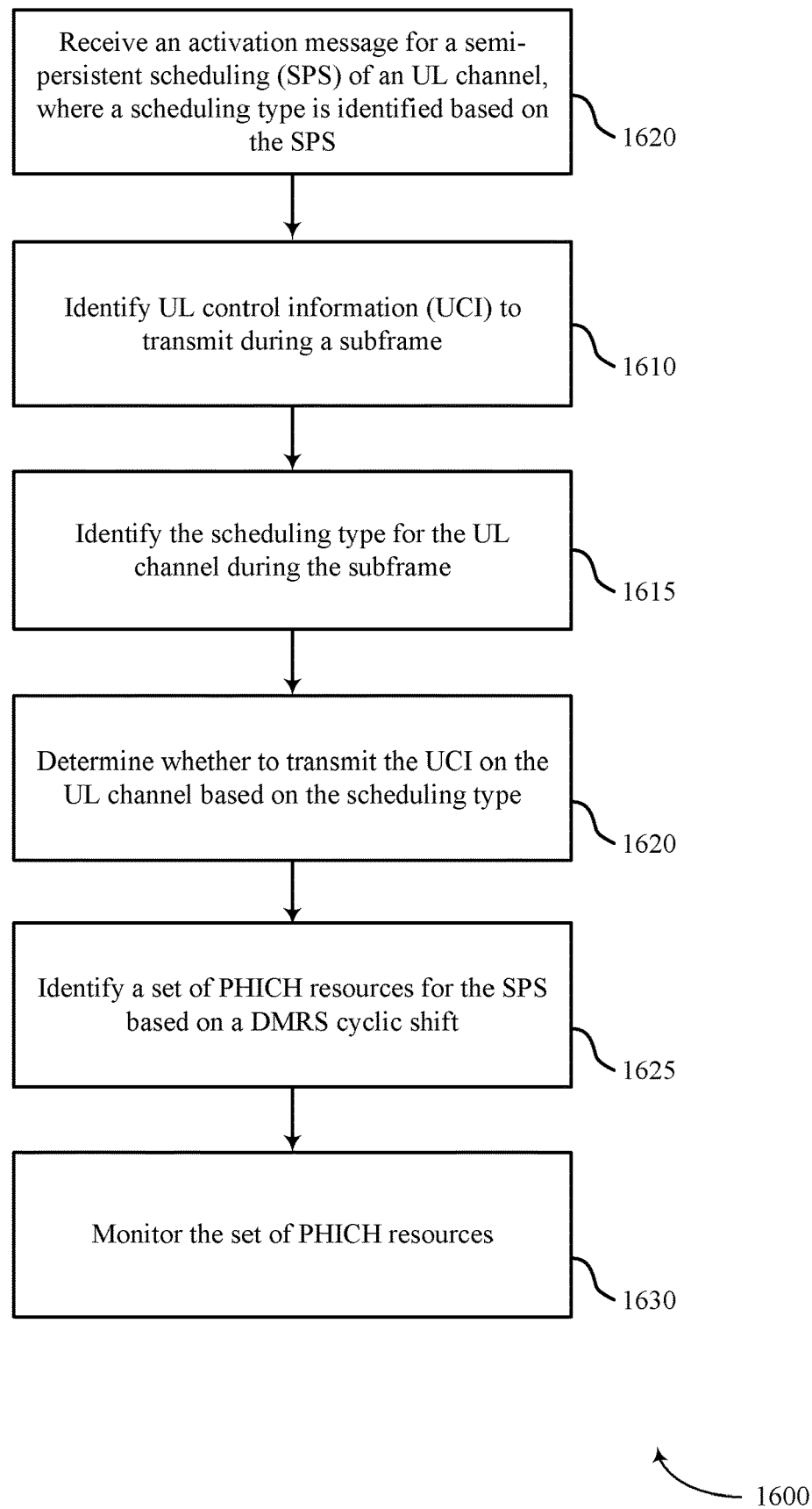

FIG. 16 shows a flowchart illustrating a method 1600 for contention-based PUSCH in accordance with various aspects of the present disclosure. The operations of method 1600 may be implemented by a device such as a UE 115 or its components as described with reference to FIGS. 1 and 2. For example, the operations of method 1600 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive at least one of a configuration or an activation message for a semi-persistent scheduling (SPS) of the UL channel, where the scheduling type is identified based on the SPS as described above with reference to FIGS. 2 through 3. In certain examples, the operations of block 1605 may be performed by the SPS component as described with reference to FIGS. 5 and 6 or transceiver 725 and antenna 730 described with reference to FIG. 7.

At block 1610, the UE 115 may identify UL control information (UCI) to transmit during a subframe as described above with reference to FIGS. 2 through 3. In certain examples, the operations of block 1610 may be performed by the UCI component as described with reference to FIGS. 5 and 6 or processor 720 described with reference to FIG. 7.

At block 1615, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 1615 may be performed by the scheduling type component as described with reference to FIGS. 5 and 6 or processor 720 described with reference to FIG. 7.

At block 1620, the UE 115 may determine whether to transmit the UCI on the UL channel based on the scheduling type as described above with reference to FIGS. 2 through 3. In certain examples, the operations of block 1620 may be performed by the channel selection component as described with reference to FIGS. 5 and 6 or processor 720 described with reference to FIG. 7.

At block 1625, the UE 115 may identify a set of PHICH resources for the SPS based on a DMRS cyclic shift as described above with reference to FIGS. 2 through 3. In certain examples, the operations of block 1625 may be performed by the PHICH component as described with reference to FIGS. 5 and 6 or processor 720 described with reference to FIG. 7.

At block 1630, the UE 115 may monitor the set of PHICH resources as described above with reference to FIGS. 2 through 3. In certain examples, the operations of block 1630 may be performed by the PHICH component as described with reference to FIGS. 5 and 6 or processor 720, transceiver 725, and/or antenna 730 described with reference to FIG. 7.

Figure 17:
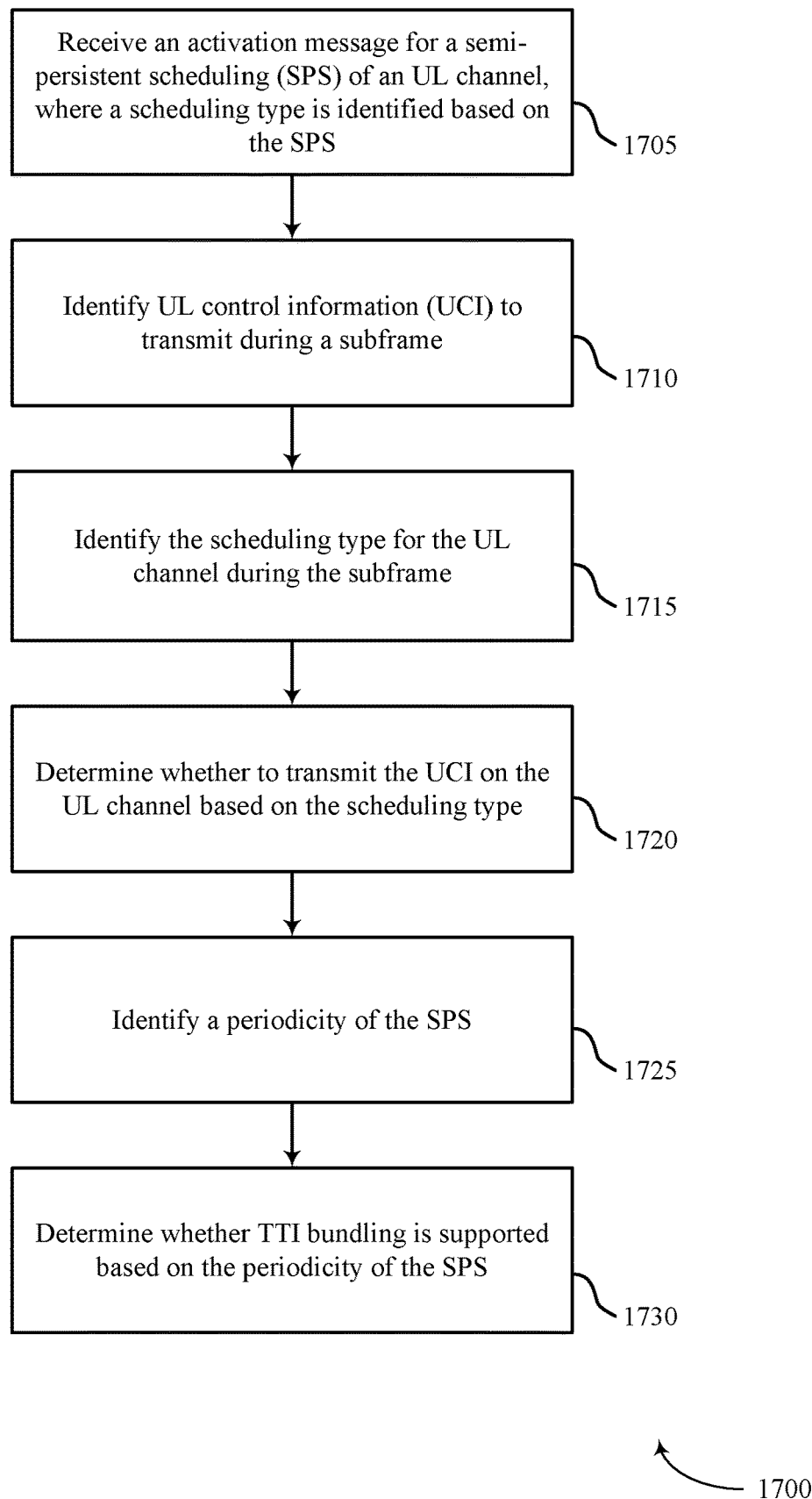

FIG. 17 shows a flowchart illustrating a method 1700 for contention-based PUSCH in accordance with various aspects of the present disclosure. The operations of method 1700 may be implemented by a device such as a UE 115 or its components as described with reference to FIGS. 1 and 2. For example, the operations of method 1700 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive at least one of a configuration or an activation message for a semi-persistent scheduling (SPS) of the UL channel, where the scheduling type is identified based on the SPS as described above with reference to FIGS. 2 through 3. In certain examples, the operations of block 1705 may be performed by the SPS component as described with reference to FIGS. 5 and 6 or transceiver 725 and antenna 730 described with reference to FIG. 7.

At block 1710, the UE 115 may identify UL control information (UCI) to transmit during a subframe as described above with reference to FIGS. 2 through 3. In certain examples, the operations of block 1710 may be performed by the UCI component as described with reference to FIGS. 5 and 6 or processor 720 described with reference to FIG. 7.

At block 1715, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 1715 may be performed by the scheduling type component as described with reference to FIGS. 5 and 6 or processor 720 described with reference to FIG. 7.

At block 1720, the UE 115 may determine whether to transmit the UCI on the UL channel based on the scheduling type as described above with reference to FIGS. 2 through 3. In certain examples, the operations of block 1720 may be performed by the channel selection component as described with reference to FIGS. 5 and 6 or processor 720 described with reference to FIG. 7.

At block 1725, the UE 115 may identify a periodicity of the SPS as described above with reference to FIGS. 2 through 3. In certain examples, the operations of block 1725 may be performed by the TTI bundling component as described with reference to FIGS. 5 and 6 or processor 720 described with reference to FIG. 7.

At block 1730, the UE 115 may determine whether TTI bundling is supported based on the periodicity of the SPS as described above with reference to FIGS. 2 through 3. In certain examples, the operations of block 1730 may be performed by the TTI bundling component as described with reference to FIGS. 5 and 6 or processor 720 described with reference to FIG. 7.

Figure 18:
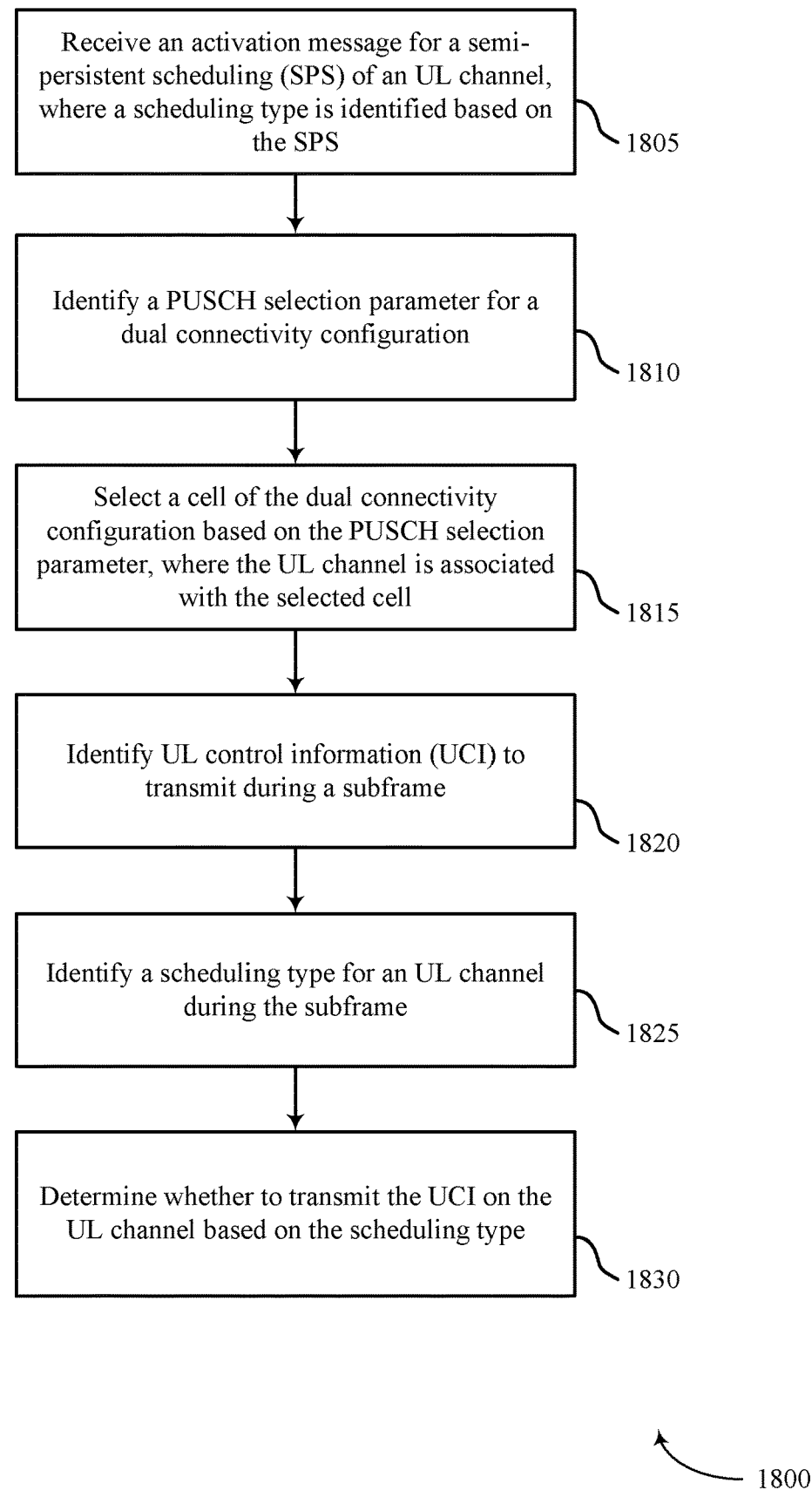

FIG. 18 shows a flowchart illustrating a method 1800 for contention-based PUSCH in accordance with various aspects of the present disclosure. The operations of method 1800 may be implemented by a device such as a UE 115 or its components as described with reference to FIGS. 1 and 2. For example, the operations of method 1800 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive at least one of a configuration or an activation message for a semi-persistent scheduling (SPS) of the UL channel, where the scheduling type is identified based on the SPS as described above with reference to FIGS. 2 through 3. In certain examples, the operations of block 1805 may be performed by the SPS component as described with reference to FIGS. 5 and 6 or transceiver 725 and antenna 730 described with reference to FIG. 7.

At block 1810, the UE 115 may identify a PUSCH selection parameter for a dual connectivity configuration as described above with reference to FIGS. 2 through 3. In certain examples, the operations of block 1810 may be performed by the dual connectivity component as described with reference to FIGS. 5 and 6 or processor 720 described with reference to FIG. 7.

At block 1815, the UE 115 may select a cell of the dual connectivity configuration based on the PUSCH selection parameter, where the UL channel is associated with the selected cell as described above with reference to FIGS. 2 through 3. In certain examples, the operations of block 1815 may be performed by the dual connectivity component as described with reference to FIGS. 5 and 6 or processor 720 described with reference to FIG. 7.

At block 1820, the UE 115 may identify UL control information (UCI) to transmit during a subframe as described above with reference to FIGS. 2 through 3. In certain examples, the operations of block 1820 may be performed by the UCI component as described with reference to FIGS. 5 and 6 or processor 720 described with reference to FIG. 7.

At block 1825, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 1825 may be performed by the scheduling type component as described with reference to FIGS. 5 and 6 or processor 720 described with reference to FIG. 7.

At block 1830, the UE 115 may determine whether to transmit the UCI on the UL channel based on the scheduling type as described above with reference to FIGS. 2 through 3. In certain examples, the operations of block 1830 may be performed by the channel selection component as described with reference to FIGS. 5 and 6 or processor 720 described with reference to FIG. 7.

Figure 19:
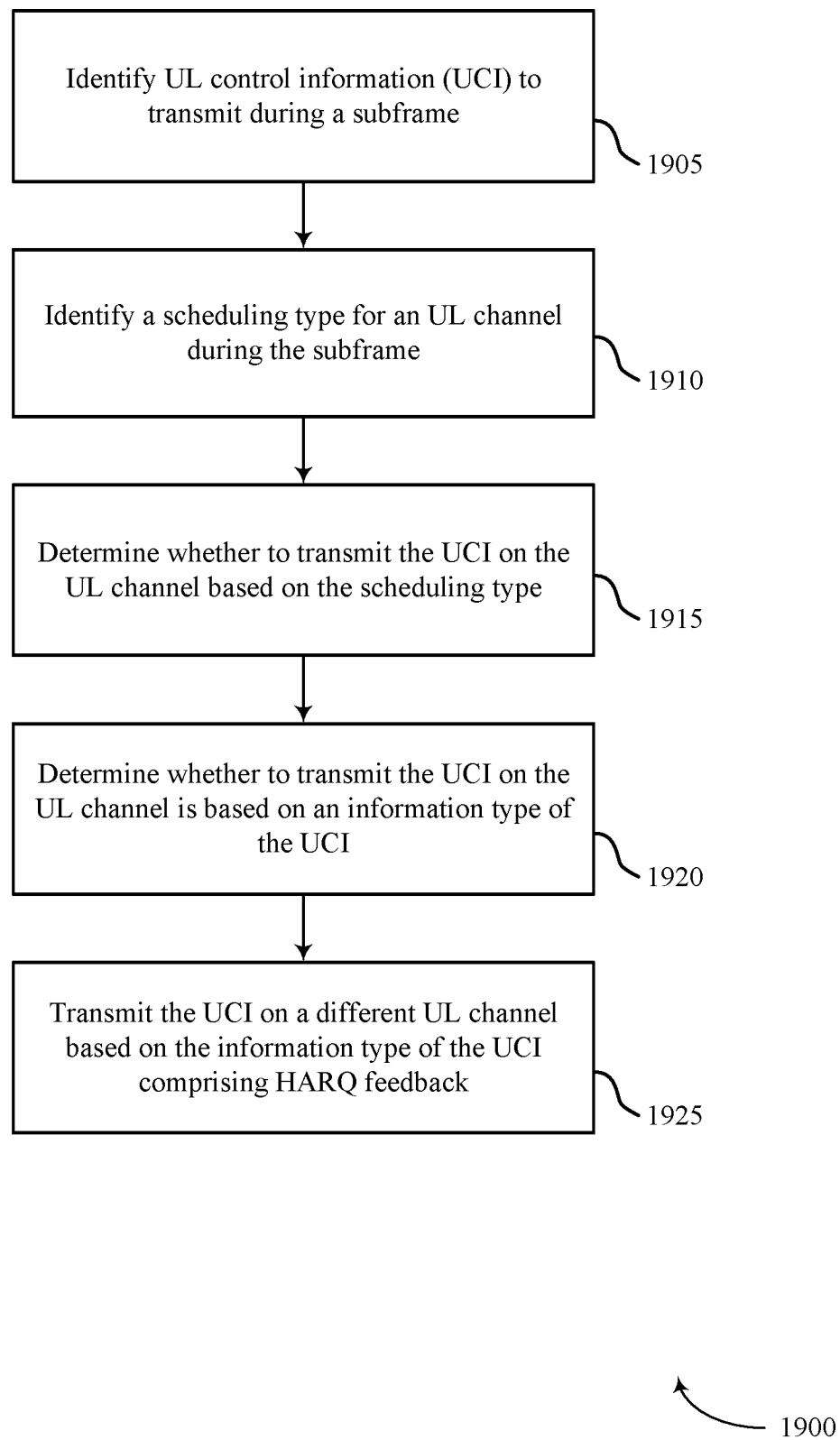

FIG. 19 shows a flowchart illustrating a method 1900 for contention-based PUSCH in accordance with various aspects of the present disclosure. The operations of method 1900 may be implemented by a device such as a UE 115 or its components as described with reference to FIGS. 1 and 2. For example, the operations of method 1900 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may identify UL control information (UCI) to transmit during a subframe as described above with reference to FIGS. 2 through 3. In certain examples, the operations of block 1905 may be performed by the UCI component as described with reference to FIGS. 5 and 6 or processor 720 described with reference to FIG. 7.

At block 1910, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 1910 may be performed by the scheduling type component as described with reference to FIGS. 5 and 6 or processor 720 described with reference to FIG. 7.

At block 1915, the UE 115 may determine whether to transmit the UCI on the UL channel based on the scheduling type as described above with reference to FIGS. 2 through 3. In certain examples, the operations of block 1915 may be performed by the channel selection component as described with reference to FIGS. 5 and 6 or processor 720 described with reference to FIG. 7.

At block 1920, the UE 115 may determine whether to transmit the UCI on the UL channel is based on an information type of the UCI as described above with reference to FIGS. 2 through 3. In certain examples, the operations of block 1920 may be performed by the channel selection component as described with reference to FIGS. 5 and 6 or processor 720 described with reference to FIG. 7.

At block 1925, the UE 115 may transmit the UCI on a different UL channel based on the information type of the UCI being HARQ feedback as described above with reference to FIGS. 2 through 3. In certain examples, the operations of block 1925 may be performed by the channel selection component as described with reference to FIGS. 5 and 6 or transceiver 725 and antenna 730 described with reference to FIG. 7.

Figure 20:
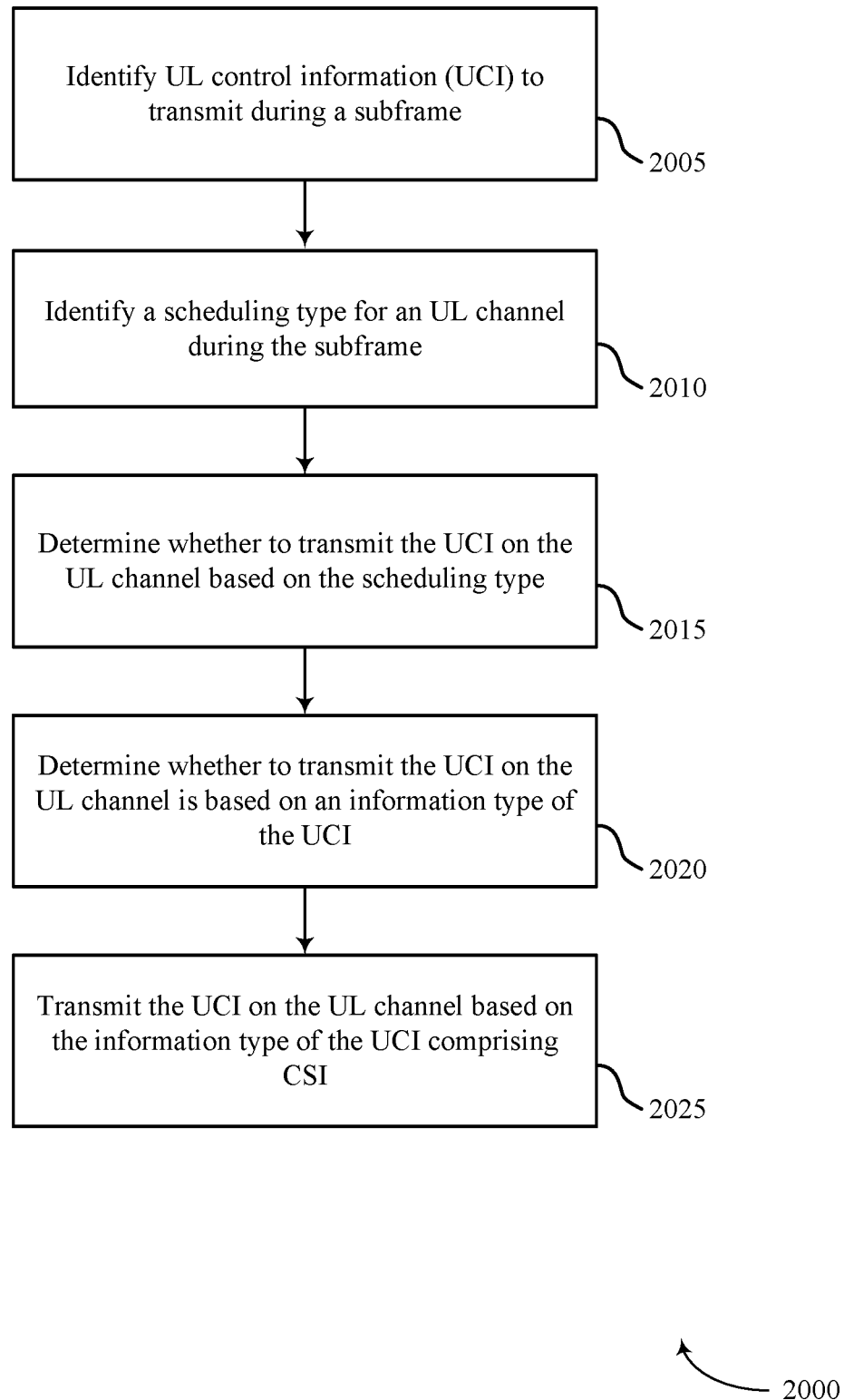

FIG. 20 shows a flowchart illustrating a method 2000 for contention-based PUSCH in accordance with various aspects of the present disclosure. The operations of method 2000 may be implemented by a device such as a UE 115 or its components as described with reference to FIGS. 1 and 2. For example, the operations of method 2000 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 2005, the UE 115 may identify UL control information (UCI) to transmit during a subframe as described above with reference to FIGS. 2 through 3. In certain examples, the operations of block 2005 may be performed by the UCI component as described with reference to FIGS. 5 and 6 or processor 720 described with reference to FIG. 7.

At block 2010, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 2010 may be performed by the scheduling type component as described with reference to FIGS. 5 and 6 or processor 720 described with reference to FIG. 7.

At block 2015, the UE 115 may determine whether to transmit the UCI on the UL channel based on the scheduling type as described above with reference to FIGS. 2 through 3. In certain examples, the operations of block 2015 may be performed by the channel selection component as described with reference to FIGS. 5 and 6 or processor 720 described with reference to FIG. 7.

At block 2020, the UE 115 may determine whether to transmit the UCI on the UL channel is based on an information type of the UCI as described above with reference to FIGS. 2 through 3. In certain examples, the operations of block 2020 may be performed by the channel selection component as described with reference to FIGS. 5 and 6 or processor 720 described with reference to FIG. 7.

At block 2025, the UE 115 may transmit the UCI on the UL channel based on the information type of the UCI being CSI as described above with reference to FIGS. 2 through 3. In certain examples, the operations of block 2025 may be performed by the channel selection component as described with reference to FIGS. 5 and 6 or transceiver 725 and antenna 730 described with reference to FIG. 7.

Figure 21:
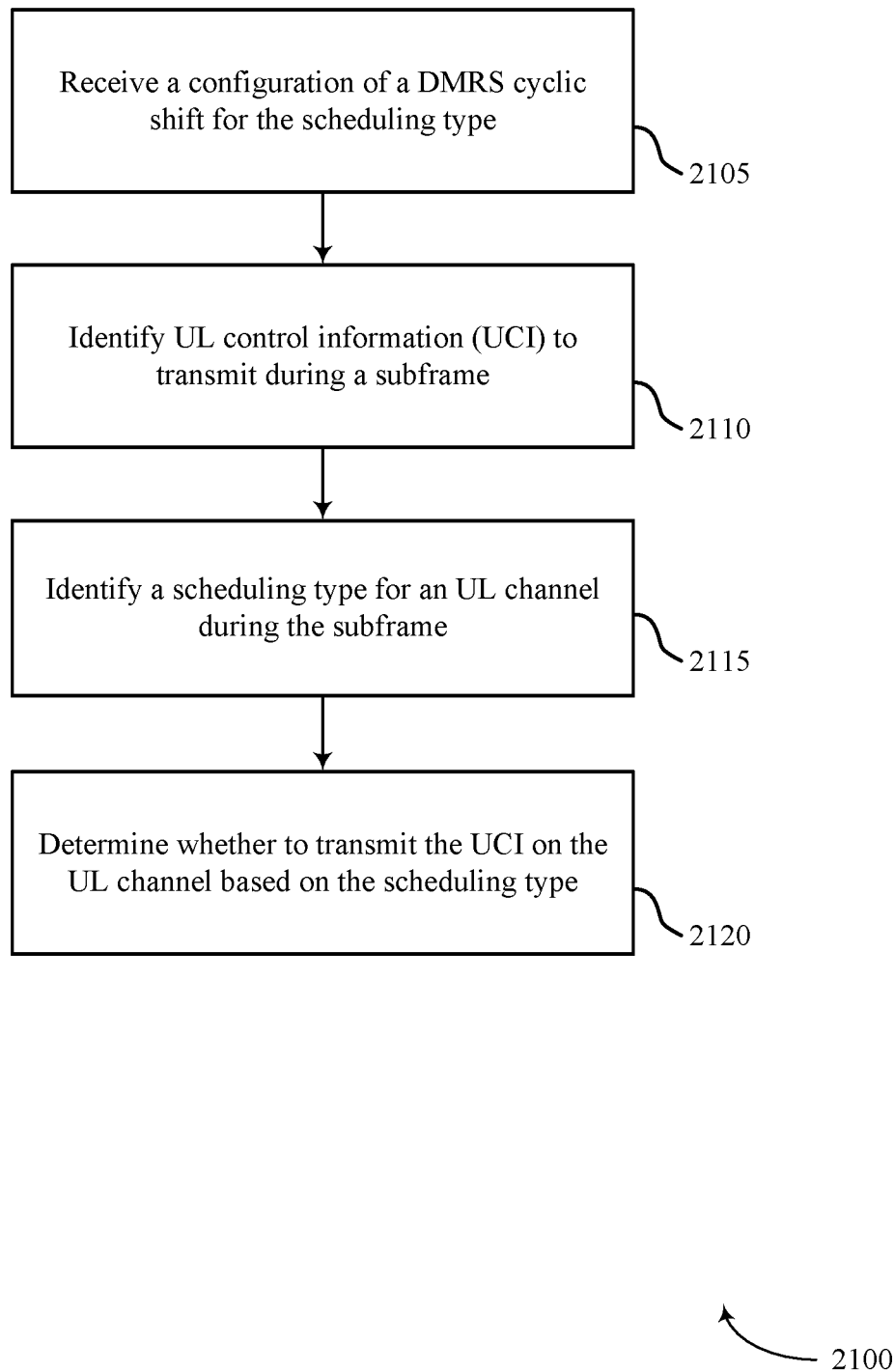

FIG. 21 shows a flowchart illustrating a method 2100 for contention-based PUSCH in accordance with various aspects of the present disclosure. The operations of method 2100 may be implemented by a device such as a UE 115 or its components as described with reference to FIGS. 1 and 2. For example, the operations of method 2100 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 2105, the UE 115 may receive a configuration of a DMRS cyclic shift for the scheduling type as described above with reference to FIGS. 2 through 3. In certain examples, the operations of block 2105 may be performed by the contention procedure component as described with reference to FIGS. 5 and 6 or transceiver 725 and antenna 730 described with reference to FIG. 7.

At block 2110, the UE 115 may identify UL control information (UCI) to transmit during a subframe as described above with reference to FIGS. 2 through 3. In certain examples, the operations of block 2110 may be performed by the UCI component as described with reference to FIGS. 5 and 6 or processor 720 described with reference to FIG. 7.

At block 2115, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 2115 may be performed by the scheduling type component as described with reference to FIGS. 5 and 6 or processor 720 described with reference to FIG. 7.

At block 2120, the UE 115 may determine whether to transmit the UCI on the UL channel based on the scheduling type as described above with reference to FIGS. 2 through 3. In certain examples, the operations of block 2120 may be performed by the channel selection component as described with reference to FIGS. 5 and 6 or processor 720 described with reference to FIG. 7.

Figure 22:
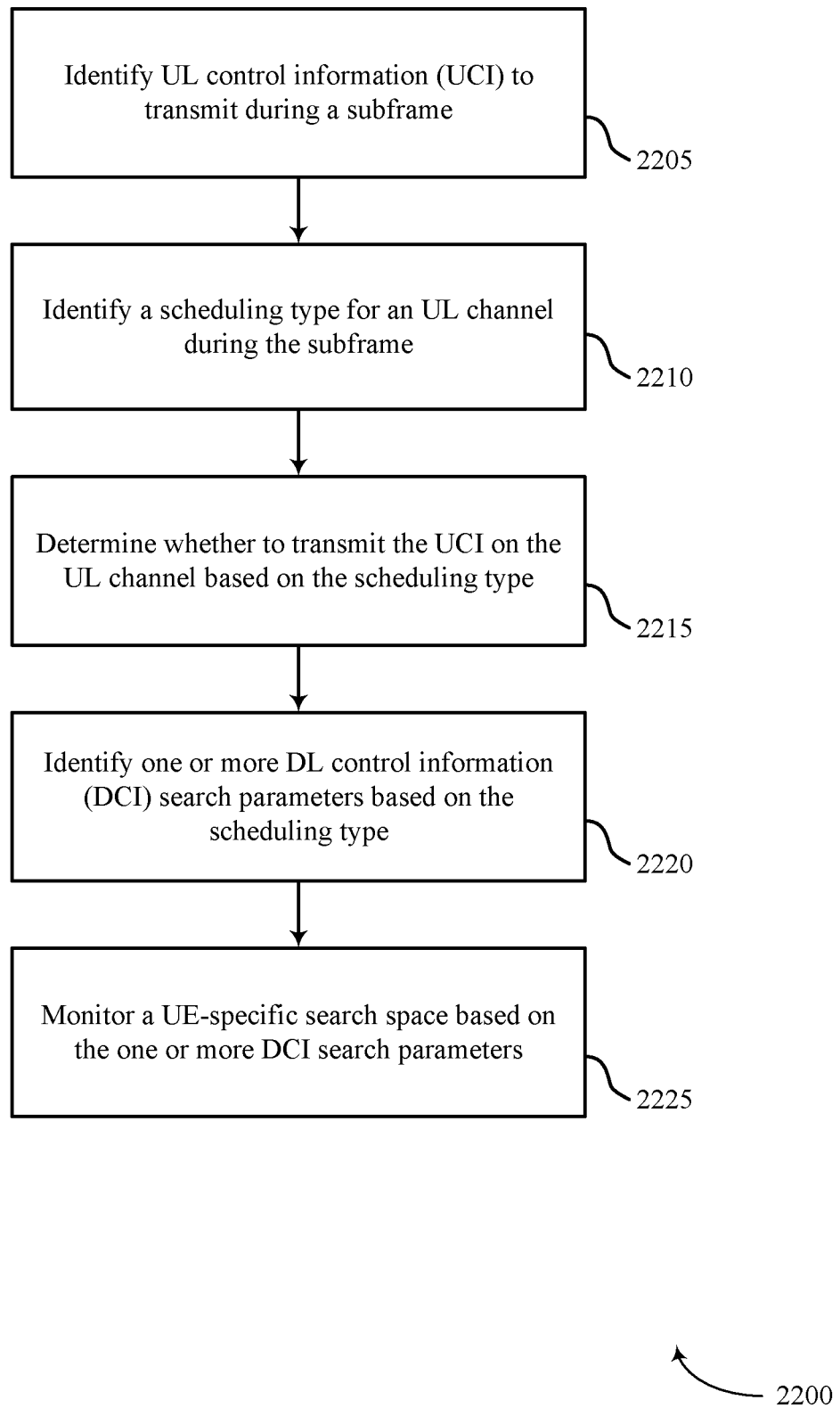

FIG. 22 shows a flowchart illustrating a method 2200 for contention-based PUSCH in accordance with various aspects of the present disclosure. The operations of method 2200 may be implemented by a device such as a UE 115 or its components as described with reference to FIGS. 1 and 2. For example, the operations of method 2200 may be performed by the UCI manager as described herein. In some examples, the UE 115 may execute a set of codes to control the functional elements of the device to perform the functions described below. Additionally or alternatively, the UE 115 may perform aspects the functions described below using special-purpose hardware.

At block 2205, the UE 115 may identify UL control information (UCI) to transmit during a subframe as described above with reference to FIGS. 2 through 3. In certain examples, the operations of block 2205 may be performed by the UCI component as described with reference to FIGS. 5 and 6 or processor 720 described with reference to FIG. 7.

At block 2210, the UE 115 may identify a scheduling type for a UL channel during the subframe, as described above with reference to FIGS. 2 through 3. The scheduling type may be a contention-based scheduling type or a non-contention-based scheduling type, for example. In certain examples, the operations of block 2210 may be performed by the scheduling type component as described with reference to FIGS. 5 and 6 or processor 720 described with reference to FIG. 7.

At block 2215, the UE 115 may determine whether to transmit the UCI on the UL channel based on the scheduling type as described above with reference to FIGS. 2 through 3. In certain examples, the operations of block 2215 may be performed by the channel selection component as described with reference to FIGS. 5 and 6 or processor 720 described with reference to FIG. 7.

At block 2220, the UE 115 may identify one or more DL control information (DCI) search parameters based on the scheduling type as described above with reference to FIGS. 2 through 3. In certain examples, the operations of block 2220 may be performed by the DCI search component as described with reference to FIGS. 5 and 6 or processor 720 described with reference to FIG. 7.

At block 2225, the UE 115 may monitor a UE-specific search space based on the one or more DCI search parameters as described above with reference to FIGS. 2 through 3. In certain examples, the operations of block 2225 may be performed by the DCI search component as described with reference to FIGS. 5 and 6 or processor 720, transceiver 725, and/or antenna 730 described with reference to FIG. 7.

Figure 23:
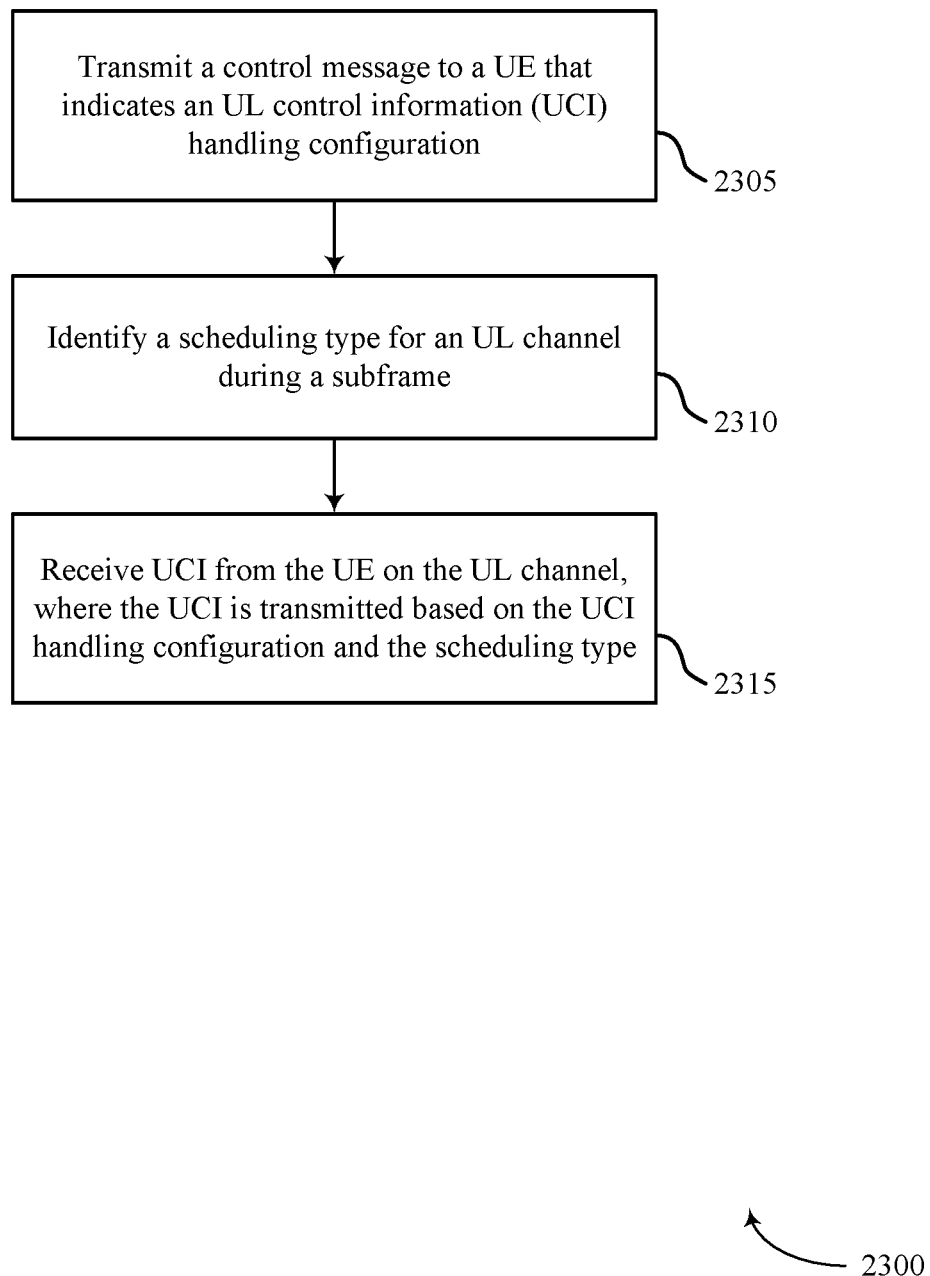

FIG. 23 shows a flowchart illustrating a method 2300 for contention-based PUSCH in accordance with various aspects of the present disclosure. The operations of method 2300 may be implemented by a device such as a base station 105 or its components as described with reference to FIGS. 1 and 2. For example, the operations of method 2300 may be performed by the network UCI manager as described herein. In some examples, the base station 105 may execute a set of codes to control the functional elements of the device to perform the functions described below. Additionally or alternatively, the base station 105 may perform aspects the functions described below using special-purpose hardware.

At block 2305, the base station 105 may transmit a control message to a UE that indicates a UL control information (UCI) handling configuration as described above with reference to FIGS. 2 through 3. In certain examples, the operations of block 2305 may be performed by the UCI configuration component as described with reference to FIGS. 9 and 10 or transceiver 1125 and antenna 1130 described with reference to FIG. 11.

At block 2310, the base station 105 may identify a scheduling type for a UL channel during a subframe, as described above with reference to FIGS. 2 through 3. The scheduling type may be a contention-based scheduling type or a non-contention-based scheduling type, for example. In certain examples, the operations of block 2310 may be performed by the scheduling type component as described with reference to FIGS. 9 and 10 or processor 1120 described with reference to FIG. 11.

At block 2315, the base station 105 may receive UCI from the UE, where the UCI is transmitted based on the UCI handling configuration and the scheduling type as described above with reference to FIGS. 2 through 3. In certain examples, the operations of block 2315 may be performed by the UCI component as described with reference to FIGS. 9 and 10 or transceiver 1125 and antenna 1130 described with reference to FIG. 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for contention-based PUSCH.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but are to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different subcarrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for contention-based PUSCH. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication at a user equipment (UE), comprising:
   identifying, by the UE, uplink control information to include within a first uplink data channel transmission;
   determining, by the UE, whether the first uplink data channel transmission is associated with individually granted resources;
   receiving a control message that indicates whether the first uplink data channel transmission may be used to transmit the uplink control information;
   determining whether to transmit the uplink control information within the first uplink data channel transmission or within a second transmission, the second transmission comprising an uplink control channel transmission or a second uplink data channel transmission, based at least in part on whether the first uplink data channel transmission is associated with individually granted resources and further based at least in part on the control message; and
   transmitting the uplink control information within the uplink control channel transmission or the second uplink data channel transmission based at least in part on the control message indicating that the first uplink data channel transmission may not be used to transmit the uplink control information.

2. The method of claim 1, wherein transmitting the uplink control information within the uplink control channel transmission or within the second uplink data channel transmission is further based at least in part on the first uplink data channel transmission not being associated with individually granted resources.

3. The method of claim 1, wherein the control message comprises a radio resource control message.

4. The method of claim 1, wherein whether the uplink control information is transmitted within the first uplink data channel transmission is further based at least in part on an information type of the uplink control information.

5. The method of claim 1, wherein:
whether the uplink control information is transmitted within the first uplink data channel transmission is further based at least in part on whether the uplink control information comprises hybrid automatic repeat request-acknowledgement (HARQ-ACK) information.

6. The method of claim 1, further comprising:
receiving a second control message that indicates one or more root sequences for one or more cyclic prefixes associated with the first uplink data channel transmission.

7. The method of claim 6, wherein the control message comprises a radio resource control message.

8. A method for wireless communication at a network entity, comprising:
identifying, by the network entity, uplink control information for reception from a user equipment (UE);
transmitting a control message that indicates whether a first uplink data transmission may be used to transmit the uplink control information;
determining whether to monitor for the uplink control information within a first uplink data channel transmission or within a second transmission, the second transmission comprising an uplink control channel transmission or a second uplink data channel transmission, based at least in part on whether the first uplink data channel transmission is associated with individually granted resources and further based at least in part on the control message; and
receiving the uplink control information within the uplink control channel transmission or the second uplink data channel transmission based at least in part on the control message indicating that the first uplink data channel transmission may not be used to transmit the uplink control information.

9. The method of claim 8, wherein receiving the uplink control information within the uplink control channel transmission or the second uplink data channel transmission is further based at least in part on the first uplink data channel transmission not being associated with individually granted resources.

10. The method of claim 8, wherein whether the uplink control information is received within the first uplink data channel transmission or the second transmission is further based at least in part on an information type of the uplink control information.

11. The method of claim 8, wherein:
whether the uplink control information is received within the first uplink data channel transmission or the second transmission is further based at least in part on whether the uplink control information comprises hybrid automatic repeat request-acknowledgement (HARQ-ACK) information.

12. The method of claim 8, further comprising:
transmitting a second control message that indicates one or more root sequences for one or more cyclic prefixes associated with the first uplink data channel transmission.

13. An apparatus for wireless communication at a user equipment (UE), comprising:
at least one processor; and
memory coupled to the at least one processor, the memory storing instructions executable by the at least one processor to cause the UE to:
identify, by the UE, uplink control information to include within a first uplink data channel transmission;
determine, by the UE, whether the first uplink data channel transmission is associated with individually granted resources;
receive a control message that indicates whether the first uplink data channel transmission may be used to transmit the uplink control information;
determine whether to transmit the uplink control information within the first uplink data channel transmission or within a second transmission, the second transmission comprising an uplink control channel transmission or a second uplink data channel transmission, based at least in part on whether the first uplink data channel transmission is associated with individually granted resources and further based at least in part on the control message; and
transmit the uplink control information within the uplink control channel transmission or the second uplink data channel transmission based at least in part on the control message indicating that the first uplink data channel transmission may not be used to transmit the uplink control information.

14. The apparatus of claim 13, wherein, to transmit the uplink control information, the instructions are executable by the at least one processor to cause the UE to:
transmit the uplink control information within the uplink control channel transmission or within the second uplink data channel transmission further based at least in part on the first uplink data channel transmission not being associated with individually granted resources.

15. The apparatus of claim 13, wherein the instructions are further executable by the at least one processor to cause the UE to:
determine whether to transmit the uplink control information within the first uplink data channel transmission or the second transmission based at least in part on an information type of the uplink control information.

16. An apparatus for wireless communication at a network entity, comprising:
at least one processor; and
memory coupled to the at least one processor, the memory storing instructions executable by the at least one processor to cause the network entity to:
identify, by the network entity, uplink control information for reception from a user equipment (UE);
transmit a control message that indicates whether a first uplink data transmission may be used to transmit the uplink control information;
determine whether to monitor for the uplink control information within a first uplink data channel transmission or within a second transmission, the second transmission comprising an uplink control channel transmission or a second uplink data channel transmission, based at least in part on whether the first uplink data channel transmission is associated with individually granted resources and further based at least in part on the control message; and receive the uplink control information within the uplink control channel transmission or the second uplink data channel transmission based at least in part on the control message indicating that the first uplink data channel transmission may not be used to transmit the uplink control information.

* * * * *